Jan. 29, 1935.  M. EWALD  1,989,090
SLICER AND PEELER
Filed Jan. 20, 1930  14 Sheets-Sheet 1

Inventor:
Mark Ewald
By [signature]
Atty.

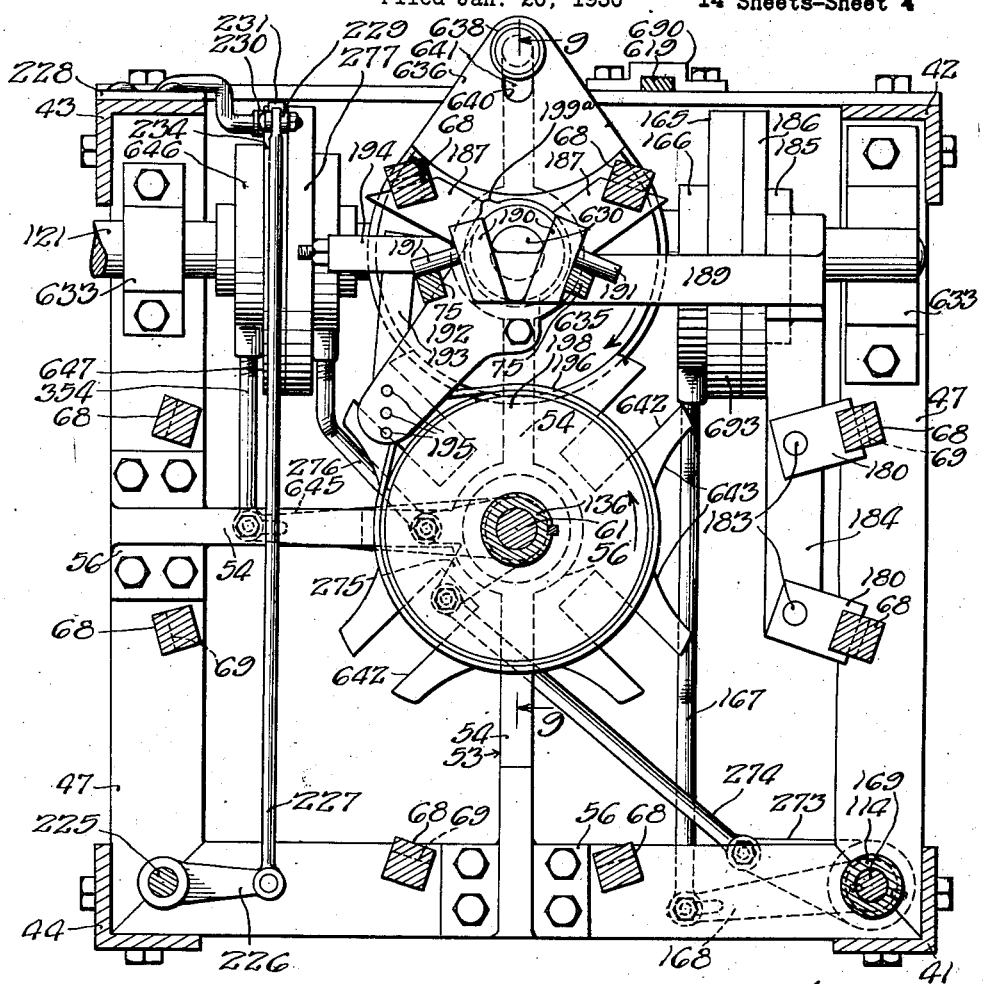
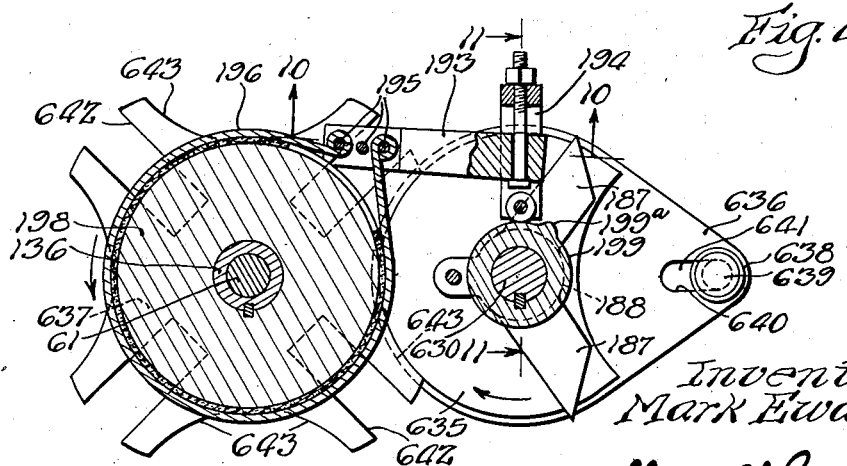
Fig. 4
Fig. 5
Inventor:
Mark Ewald

Jan. 29, 1935.  M. EWALD  1,989,090
SLICER AND PEELER
Filed Jan. 20, 1930    14 Sheets-Sheet 5

Inventor:
Mark Ewald
By

Jan. 29, 1935. M. EWALD 1,989,090
SLICER AND PEELER
Filed Jan. 20, 1930 14 Sheets-Sheet 6
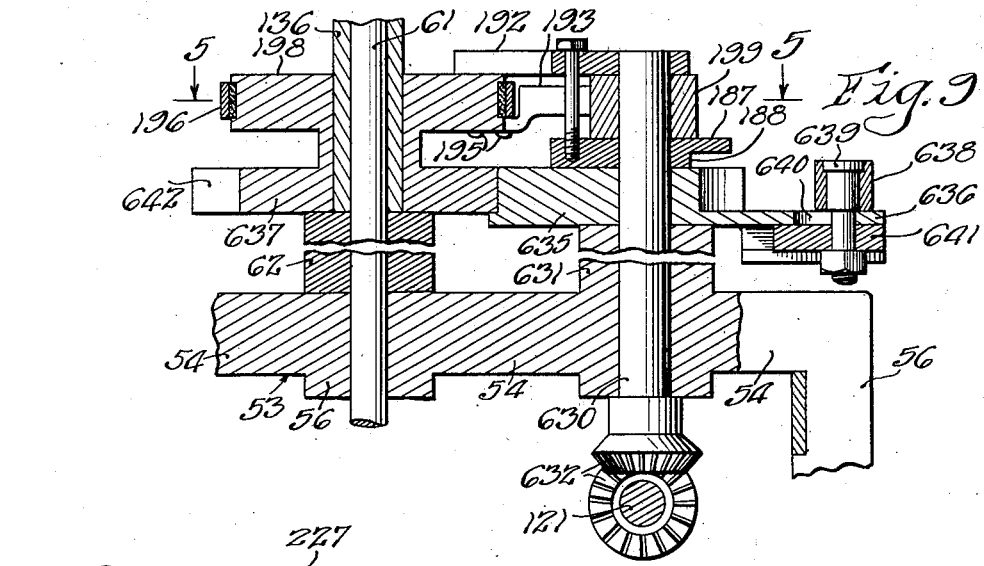
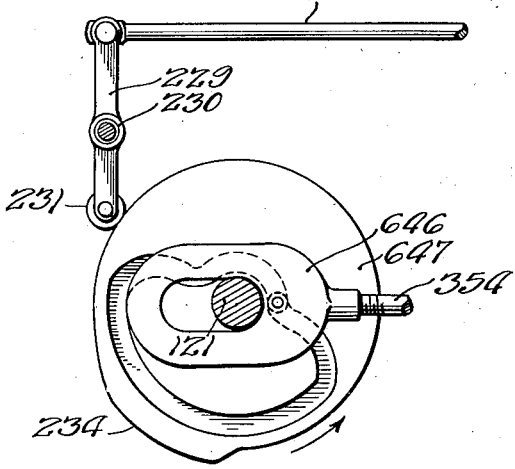
Fig. 21
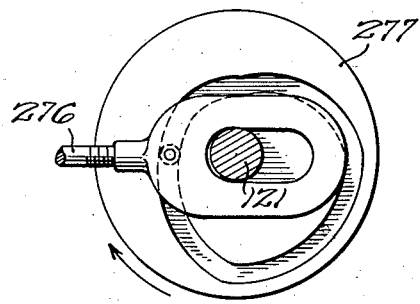
Fig. 22
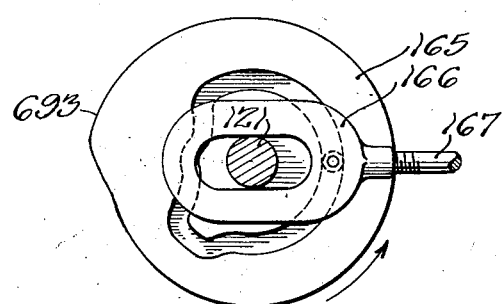
Fig. 23
Inventor.
Mark Ewald
By [signature]
Atty.

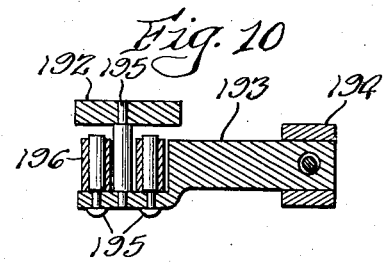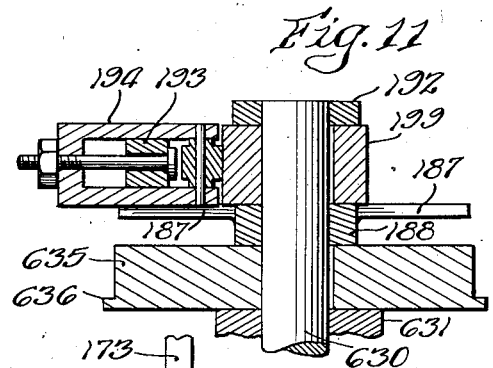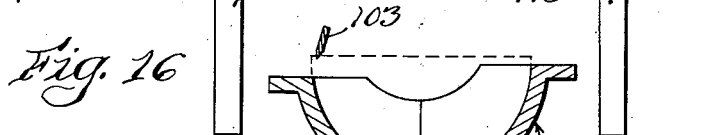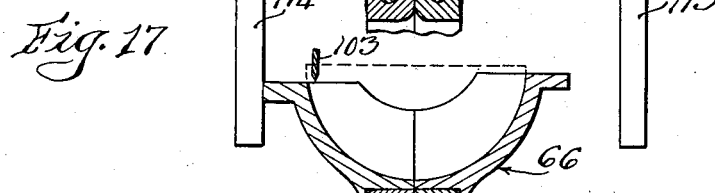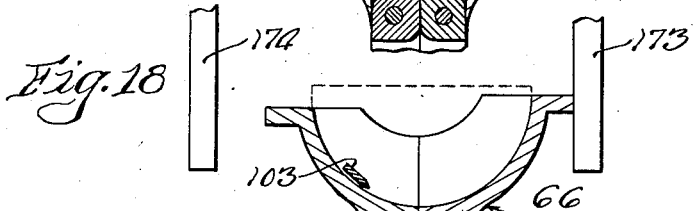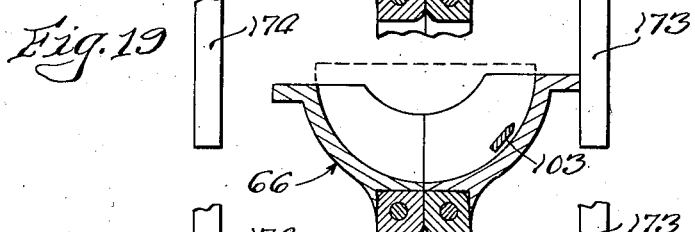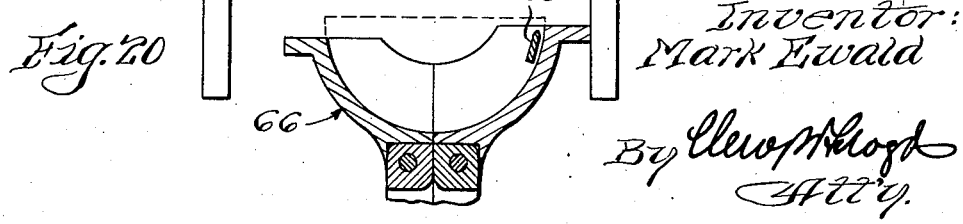

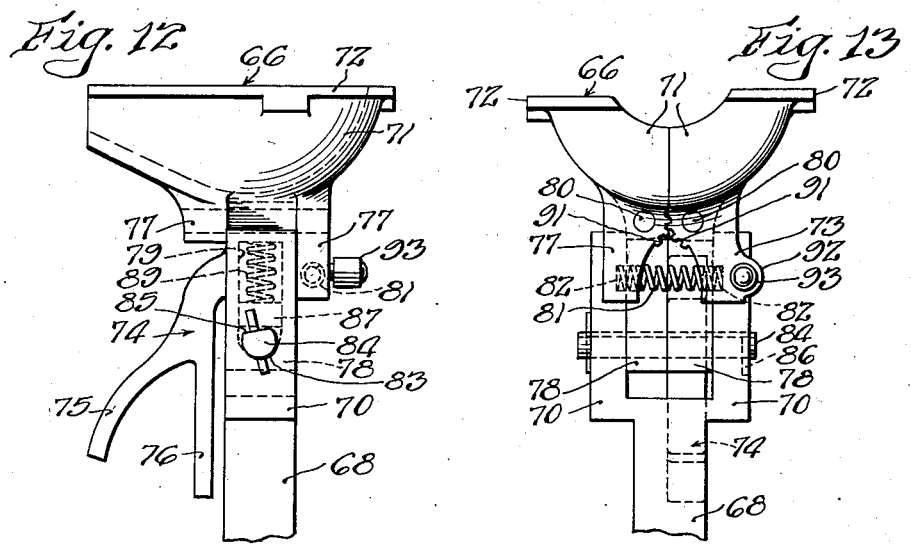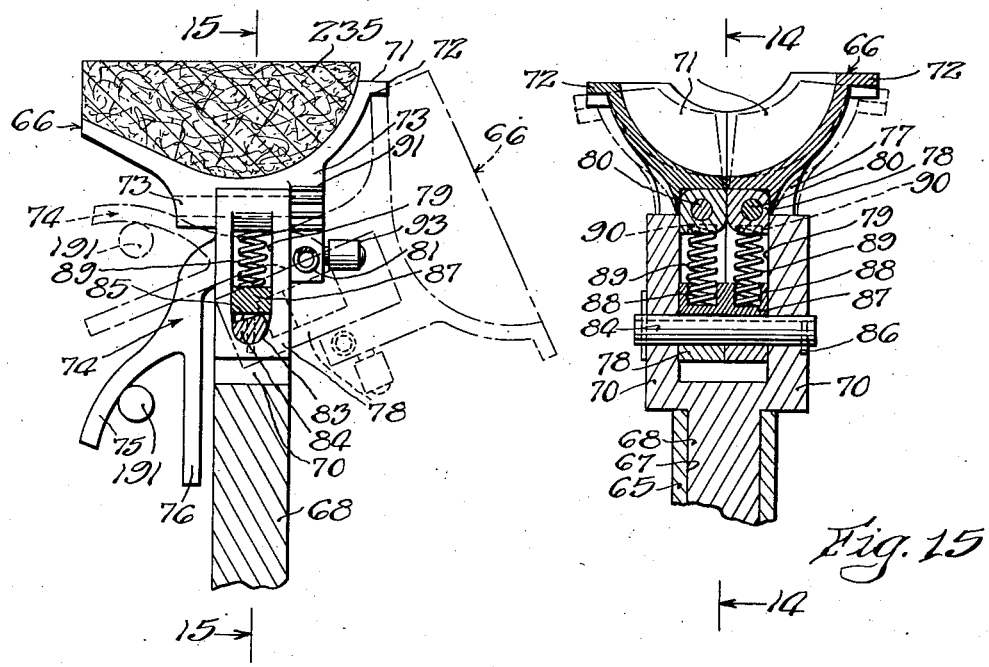

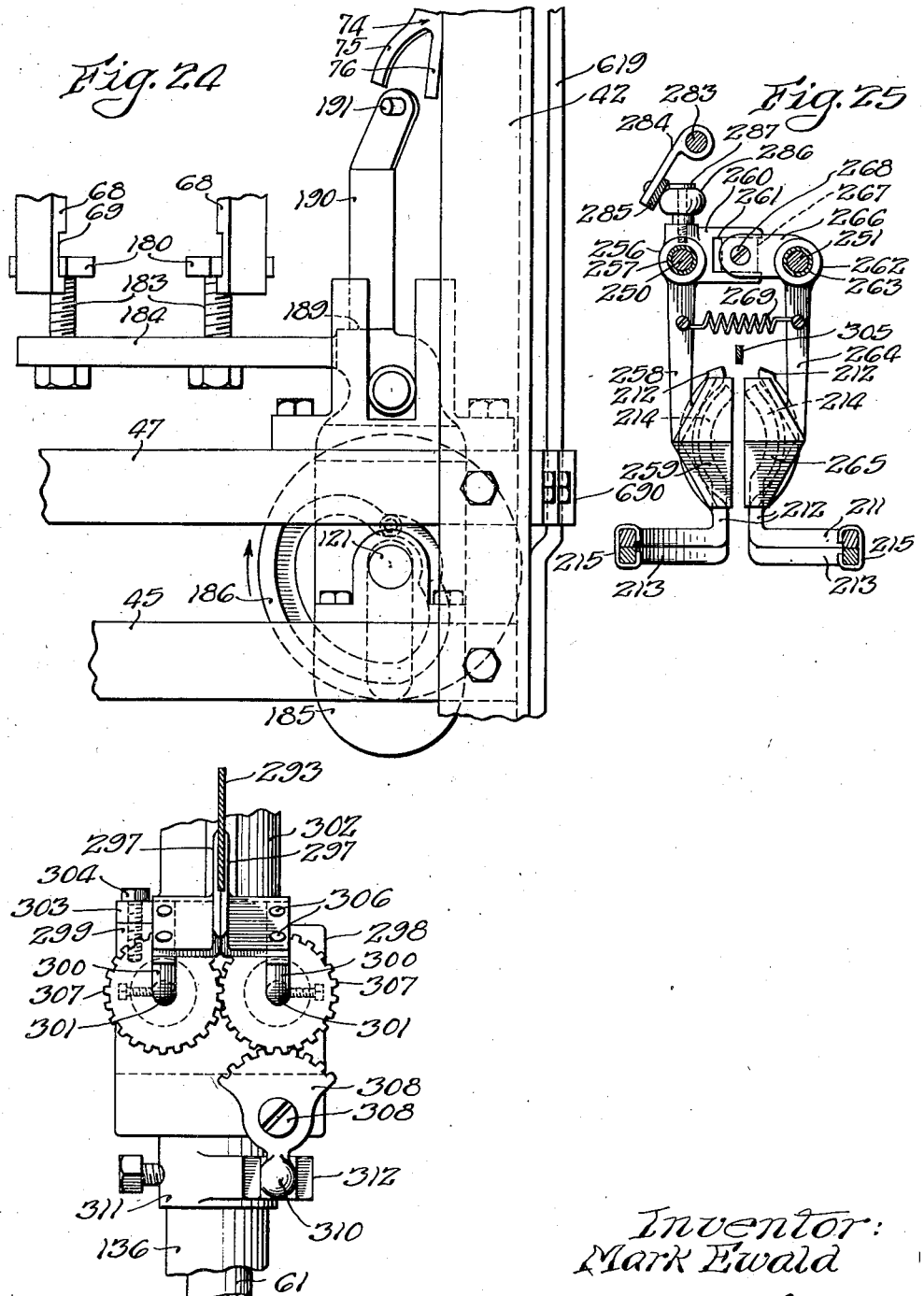

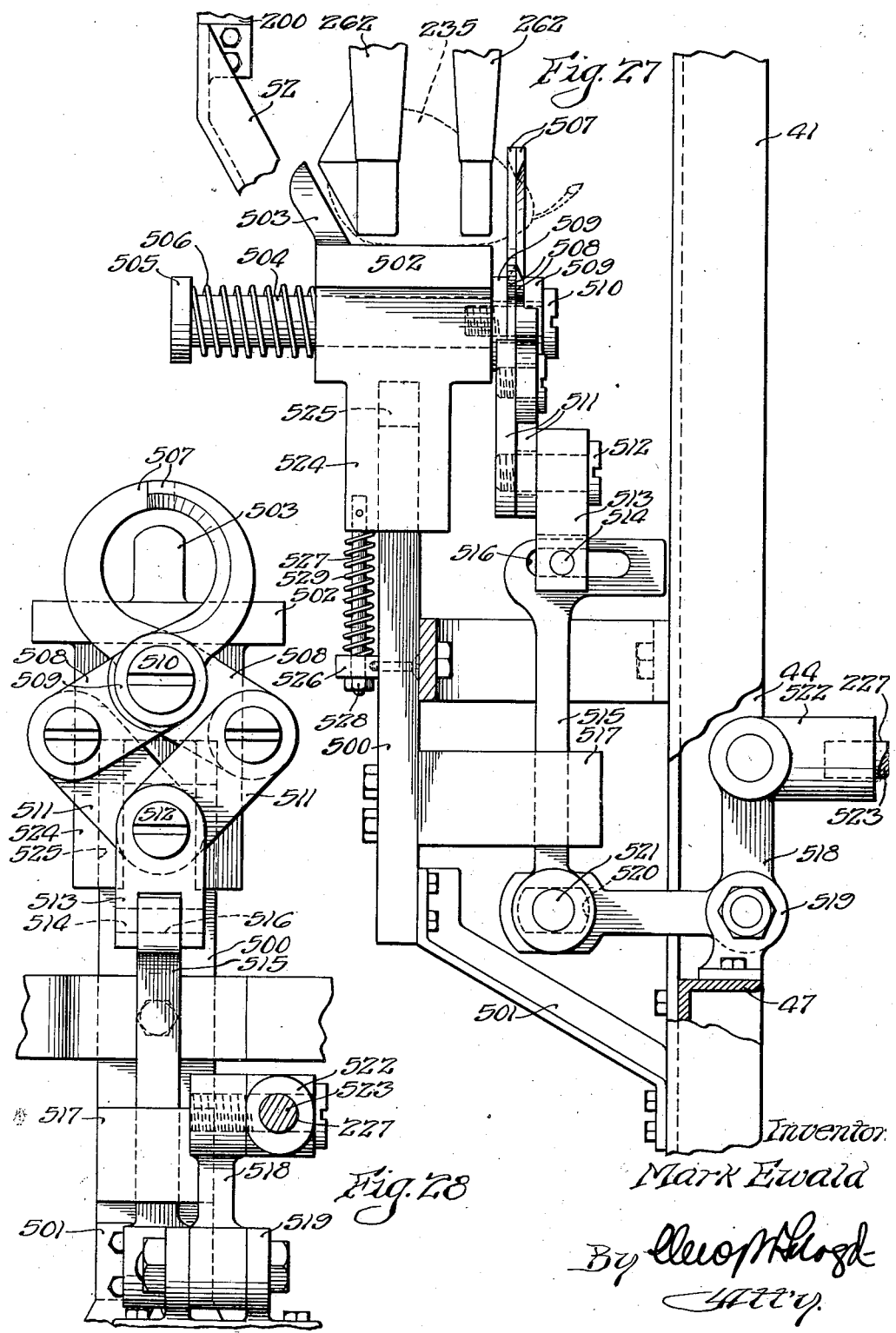

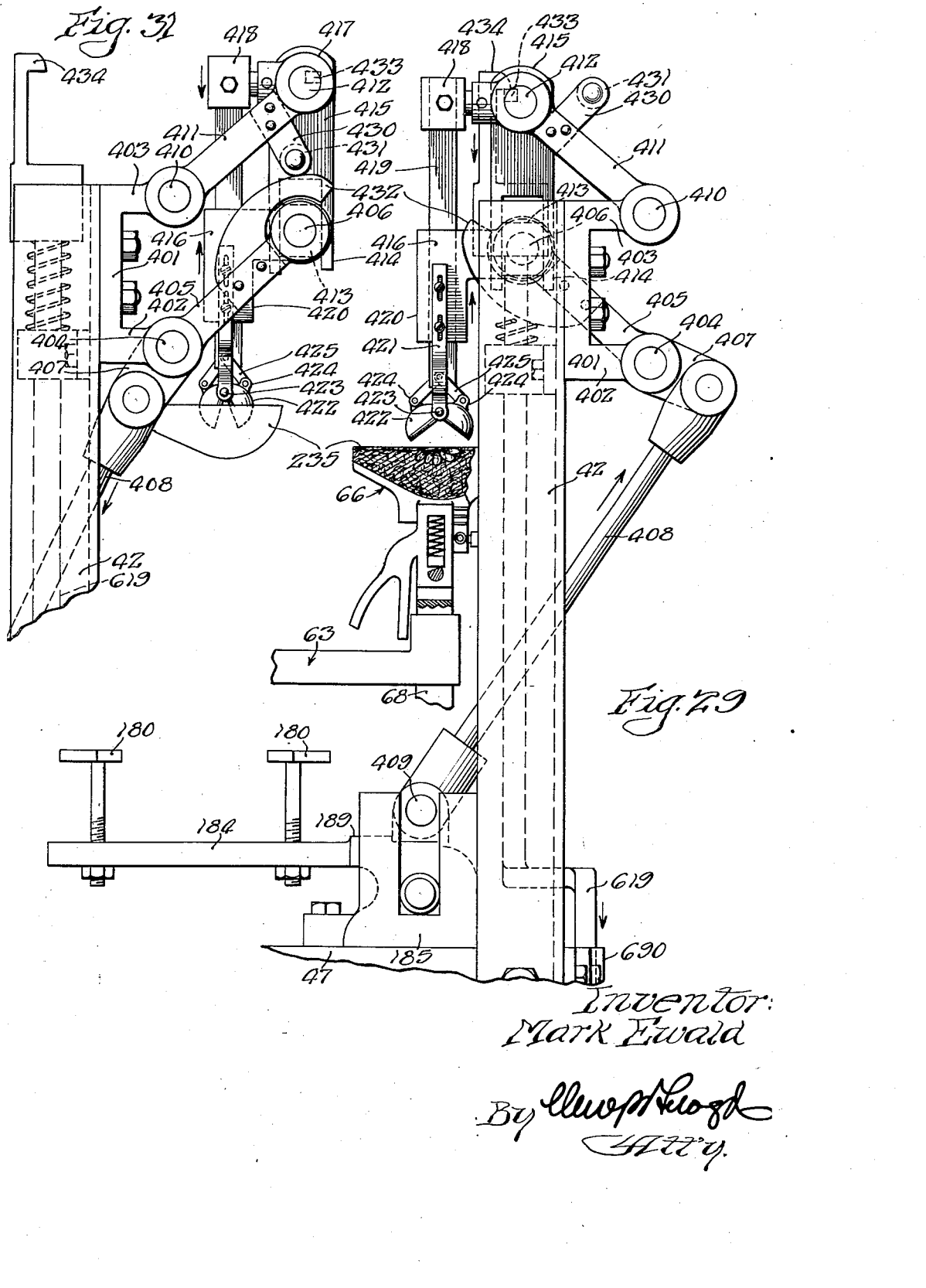

Jan. 29, 1935.  M. EWALD  1,989,090
SLICER AND PEELER
Filed Jan. 20, 1930  14 Sheets-Sheet 12
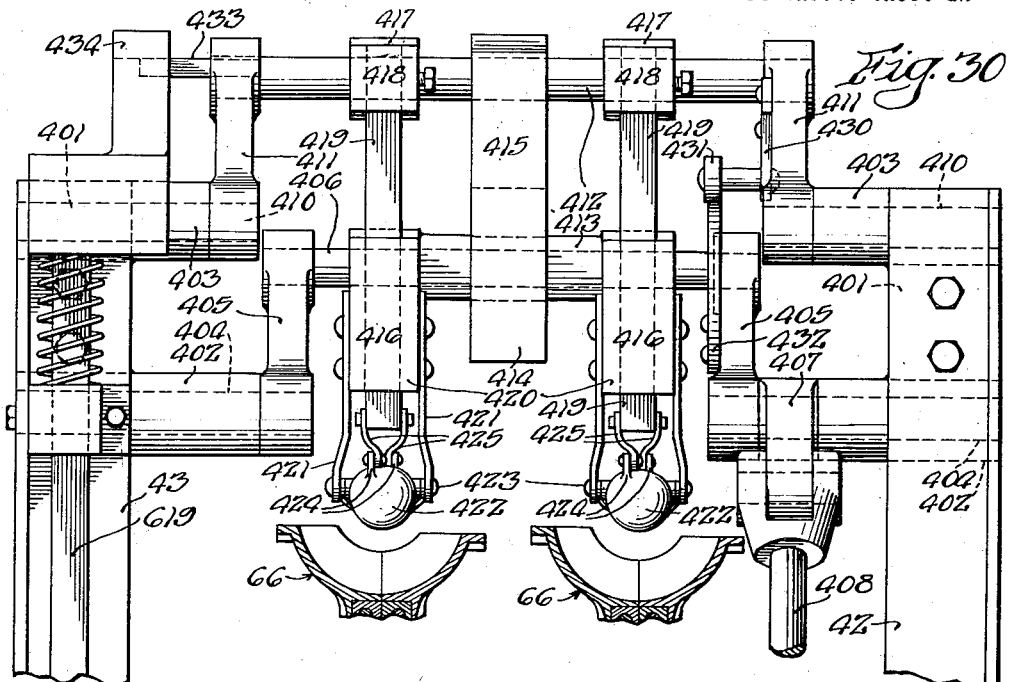
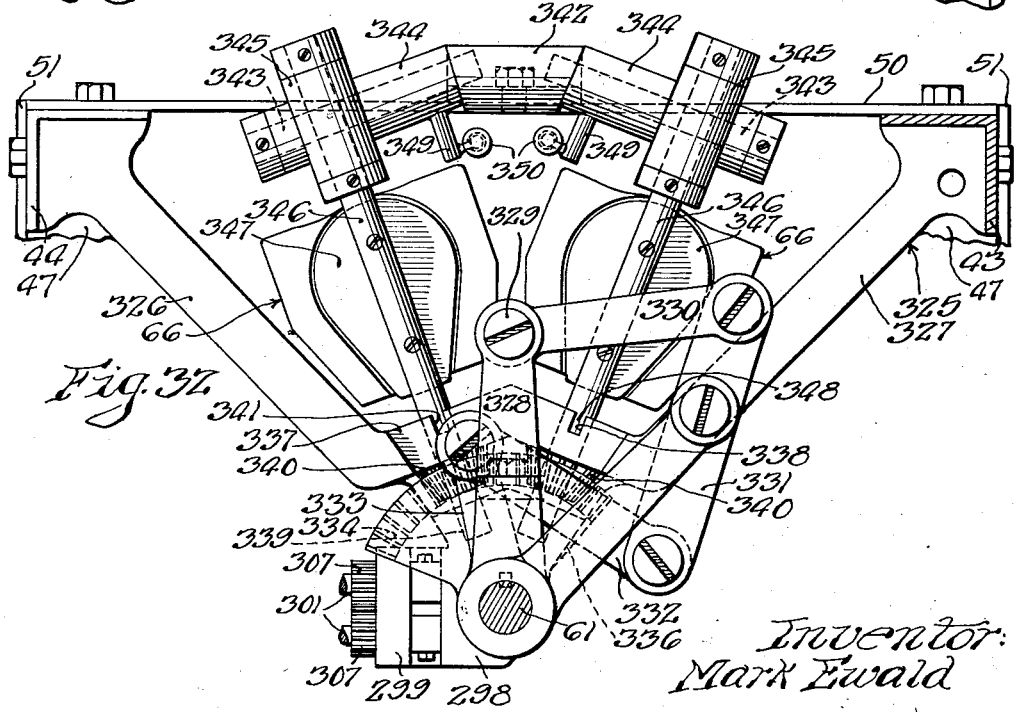
Inventor:
Mark Ewald

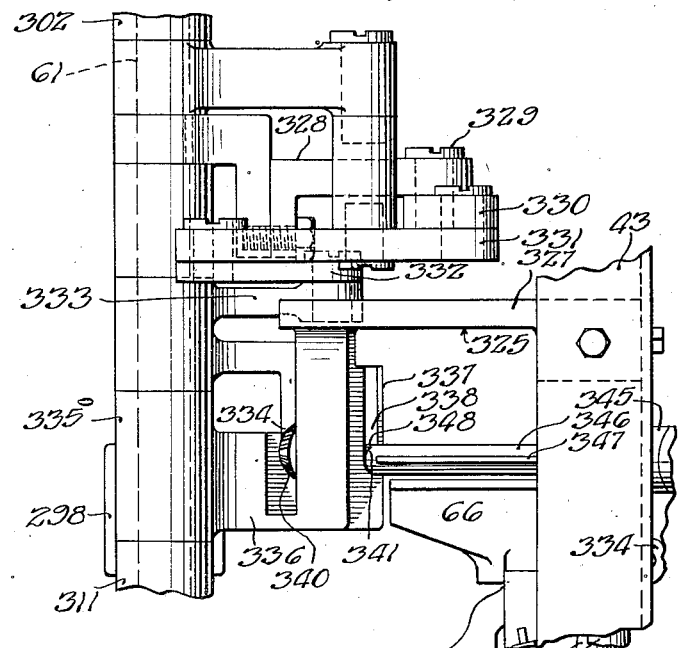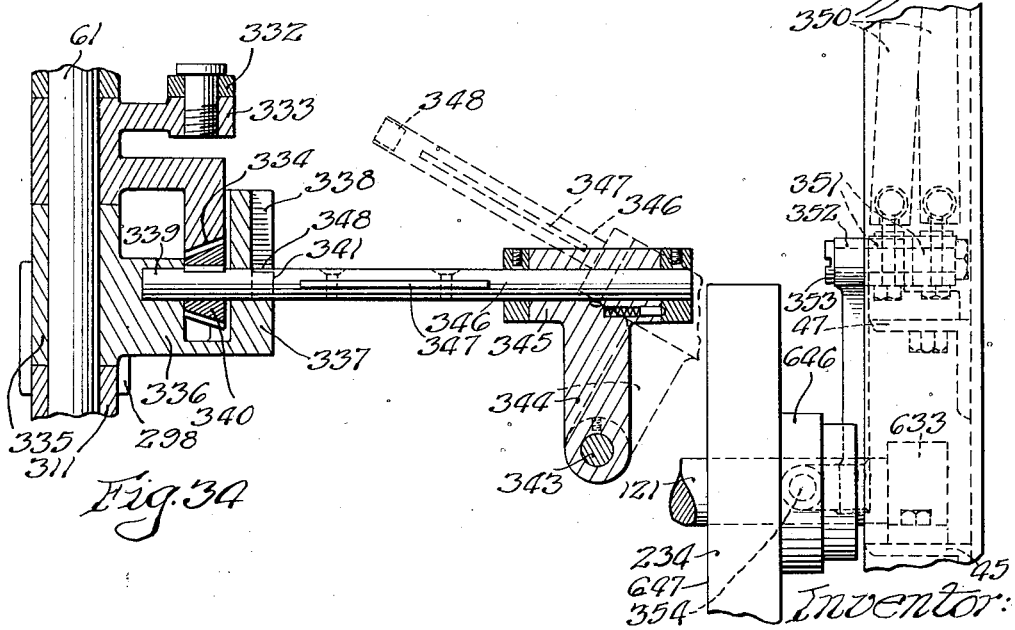

Jan. 29, 1935. M. EWALD 1,989,090
SLICER AND PEELER
Filed Jan. 20, 1930 14 Sheets-Sheet 14

Inventor:
Mark Ewald

Patented Jan. 29, 1935

1,989,090

UNITED STATES PATENT OFFICE 1,989,090

SLICER AND PEELER

Mark Ewald, Olympia, Wash., assignor to Special Equipment Company, Portland, Oreg., a corporation of Oregon Application January 20, 1930, Serial No. 421,954

69 Claims. (Cl. 146—33)

The present invention relates to fruit handling apparatus and has particularly to do with a device which receives a fruit and thereafter operates thereon to divide the fruit into parts, and remove its peel and core, discharging the peeled, coreless and divided fruit directly into a canning line in a canning factory.

In the apparatus herein described, the steps of preparing the fruit for canning may be arranged in the following order: Removing the stem end, if this is to be done, splitting the pear, peeling the fruit, and coring such fruit, the operation of coring being coincidental to discharging the fruit from the machine. Other apparatus is employed for ridding the device of peelings. A modified form of the invention is shown in which the fruit is not cored, the fruit and peeling being concurrently discharged from the device. This machine is useful for preparing fruit for the trade which desires fruit with the core retained therein.

The machines herein described, therefore, automatically, and in a single device, convert the fruit from its natural state into divisions suitable for canning. Fruit treated therein may be placed directly upon the canning line conveyor.

The following is a list of corelated co-pending applications for Letters Patent of the applicant:

Application serially numbered 187,158, filed April 28, 1927, and renewed October 28, 1932, entitled Peeling machine;

Application serially numbered 234,676, filed November 21, 1927, and entitled Coring machine; and Application serially numbered 302,712, filed August 29, 1928, and entitled Peeling machine.

Included in the objects of the invention, among others, are the following:—

A new and novel device for completely preparing fruit for canning.

An unique apparatus for depriving a pear or similar fruit of its stem end.

An improved means for loading fruit into a peeling machine, such loading means including a splitting device, a stem remover, and means for forcing the split fruit into peeling cups.

An unique splitting device for fruit.

An unique means for mechanically placing split fruit in a peeling cup or the like.

An improved fruit peeling apparatus.

An unique corer.

The combination of a fruit coring and discharge apparatus.

A novel discharge device for a fruit peeler.

An improved means for ridding peeling cups of peeling which has been separated from fruit.

Means for carrying on in a single machine the various operations of preparing a pear and other fruit for canning or other use and including the steps of depriving the fruit of its stem, peel and core, in combination with apparatus for dividing the fruit into desired fractional portions.

A device, as described in the preceding paragraph, having means for cleansing such device of refuse, such as the fruit peel and the core.

An improved peeling device having discharge means avoiding the necessity for moving the fruit holding parts.

These objects, and such other objects as may hereinafter appear, are obtained by a novel construction, unique arrangement, and improved combination of elements constituting the several forms of the invention illustrated in the accompanying drawings; in which:—

Figure 4 is a transverse section illustrative of the several cams and the braking element illustrated in the preceding figures;

Figure 5 is a transverse sectional detail of a Geneva gear for intermittently rotating the turntable and of a braking element therefor, the section being on the line 5—5 of Figure 9;

Figure 9 is a vertical sectional detail of the Geneva gear previously illustrated and is on the line 9—9 of Figure 4;

Figure 1:
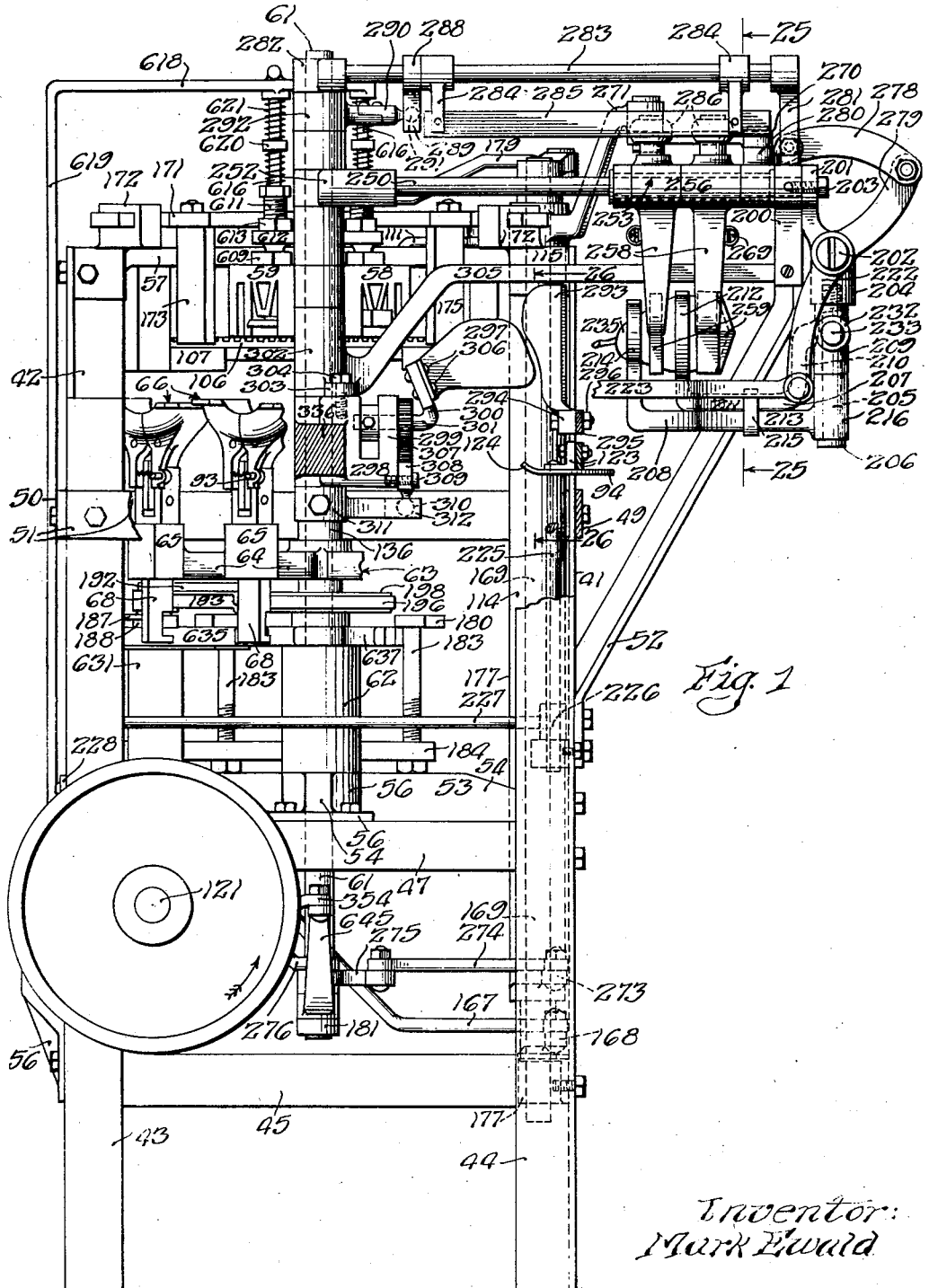
Figure 1 is a side elevation of a complete machine, with parts broken away to illustrate mechanical details of a feeding and splitting portion.
Figure 2:
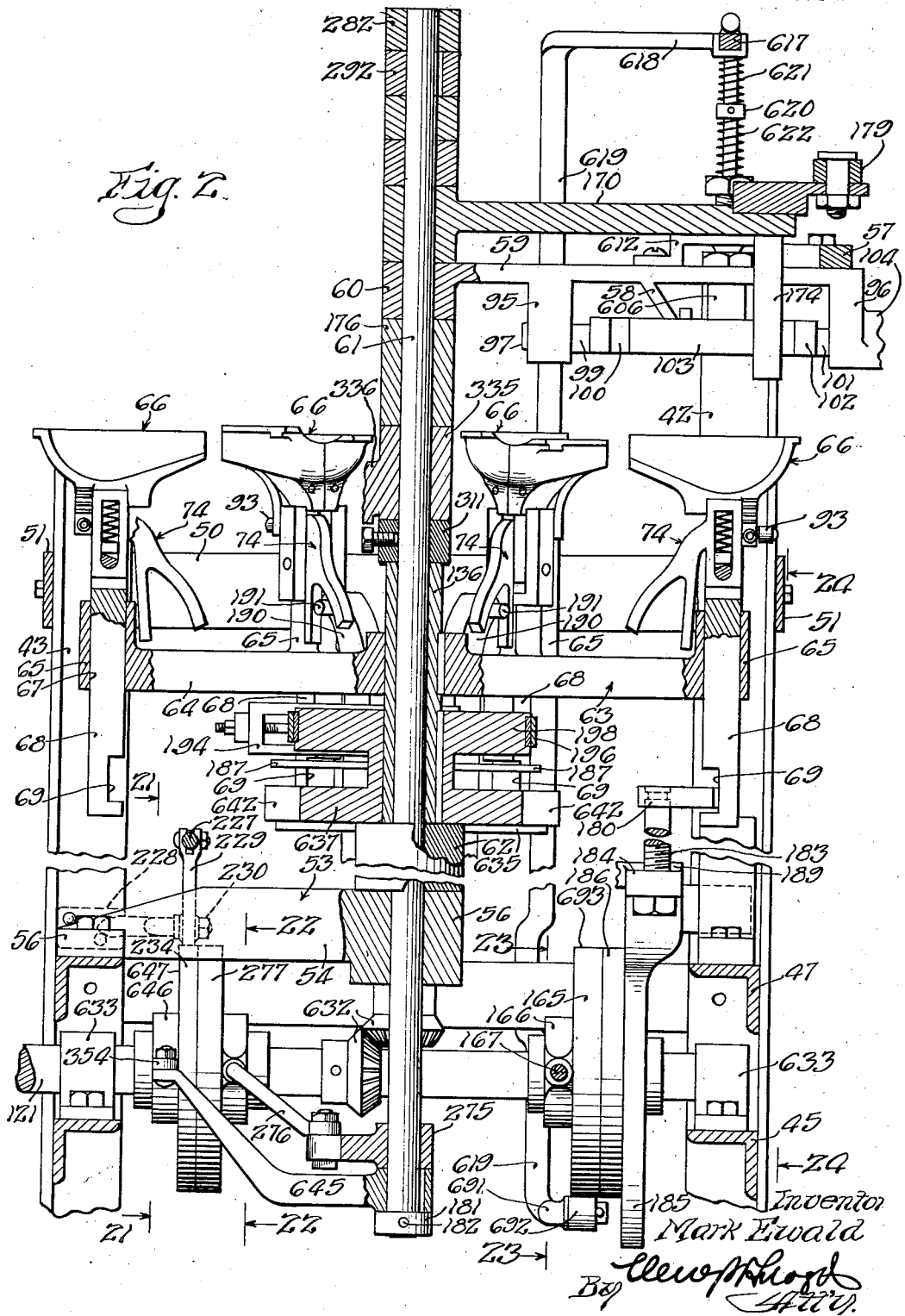
Figure 2 is a condensed vertical section on the line 2—2 of Figure 3, some intermediate parts being removed to clarify the view.
Figure 35:
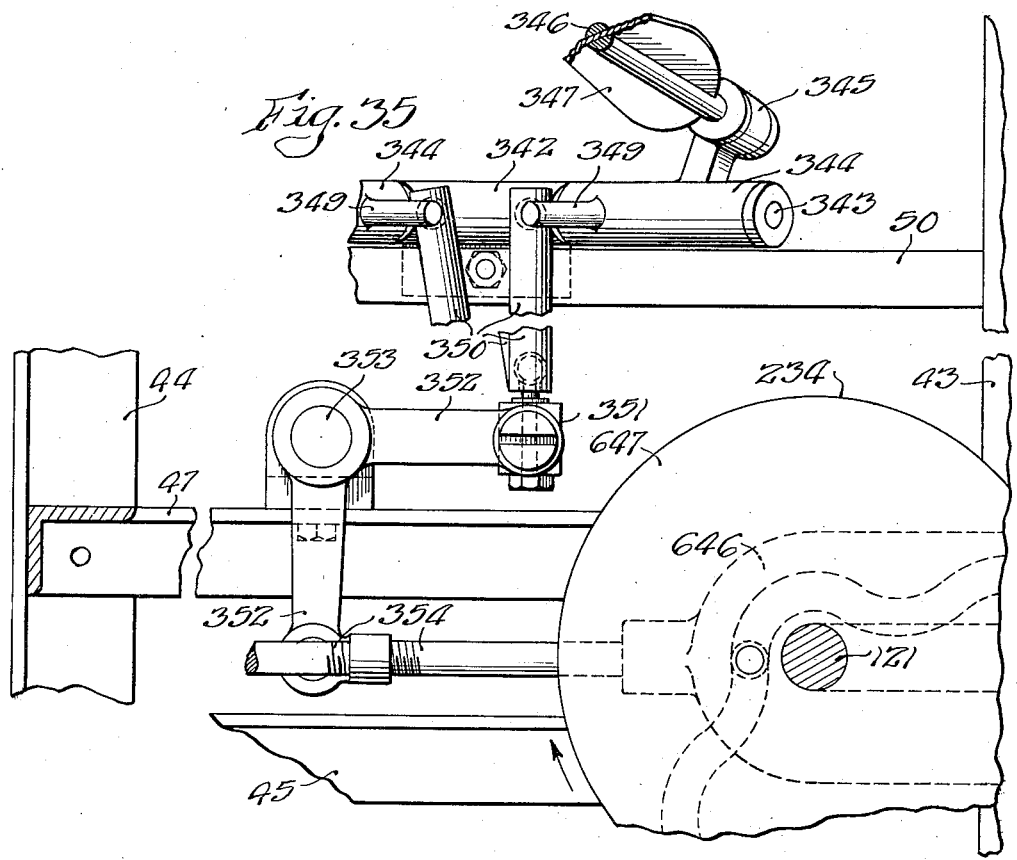
Figure 36:
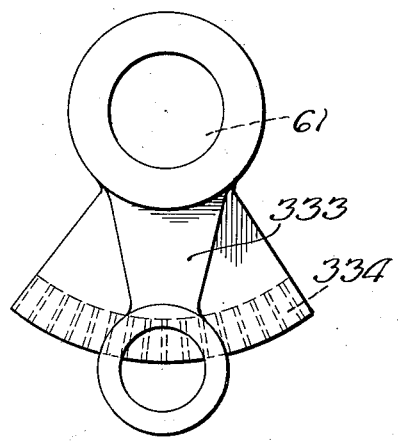
Figure 37:
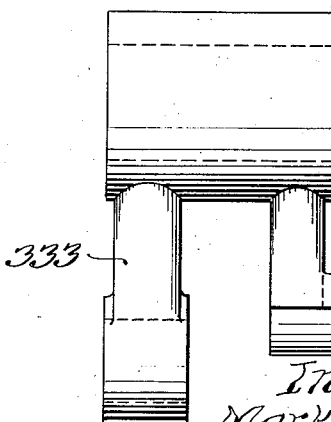

Figures 10 and 11 are sections on the lines 10—10 and 11—11 of the Geneva gear and braking means;

Figures 12, 13, 14 and 15 are side and end views, and longitudinal and transverse sections, respectively, of the fruit cup mechanism;

Figures 16, 17, 18, 19 and 20 are fragmentary transverse sections through the cups, knife, and cup shifting member illustrative of the positions of these parts during the course of a fruit paring operation;

Figures 21, 22 and 23 are details of cams adapted to operate the various parts of the apparatus, and are on the lines 21—21, 22—22, and 23—23, respectively, of Figure 2;

Figure 24 is a fragmentary detail, partly in section and partly in elevation, illustrating a means for upsetting fruit cups to discharge the contents therefrom, and is on the line 24—24 of Figure 2;

Figure 25 is a vertical sectional detail on the line 25—25 of Figure 1, of a fruit feeding device;

Figure 26 is a similar detail on the line 26—26 of Figure 1, and is illustrative of a fruit splitting mechanism;

Figure 27 is a side elevation of a second form of fruit feeding apparatus, which apparatus includes end clipping means;

Figure 28 is an end elevation of such fruit feeding apparatus, and is illustrative of the operation of the end clipping means;

Figure 29 is an end elevation of a coring attachment, two of which may be made a part of the illustrated machine;

Figure 30 is a side elevation of the coring device shown in Figure 29;

Figure 31 is a detail, in elevation, of a cam and roller which governs the distance between the shafts in said coring device;

Figure 32 is a fragmentary plan view of peeling extractors which may be employed when the cups are not dumped;

Figure 33 is a vertical section of the operating mechanism for the fruit peeling extractors;

Figure 34 is an additional sectional detail illustrative of the fruit peeling extractor devices and the manner of their operation;

Figure 35 is a detail, in elevation, some parts being shown fragmentarily and schematically, and illustrating the operation of the shafts in the fruit peeling extractors; and Figures 36 and 37 are details, in elevation, illustrative of the segments cooperating with the gears upon the peeling extractor for the operation of the latter.

Like reference characters are used to designate similar parts in the drawings and in the description of the apparatus which follows.

For convenience, and for clarity of understanding, the description of the apparatus is divided into a number of parts, and these parts are given titles, the matter relating to each major part of the machine being found primarily under the particular title selected.

The machine frame

The particular form of frame adapted for the device and illustrated herein is but one of many frames which may be devised for supporting an apparatus of this character. The illustrated frame comprises four uprights, 41, 42, 43 and 44, which may be angle irons, their outer faces forming the corners of the frame. Frame members 41 and 42, in the present instance, are of greater height than frame members 43 and 44.

For joining the frame members 41, 42, 43 and 44 together, there are provided transverse members 45, which are disposed adjacent to the floor or support for the frame. Additionally, there are three transverse members 47 in a higher plane than the transverse members 45, these three transverse members extending from upright 43 to upright 44, from upright 44 to upright 41, and from upright 41 to upright 42.

Figure 3:
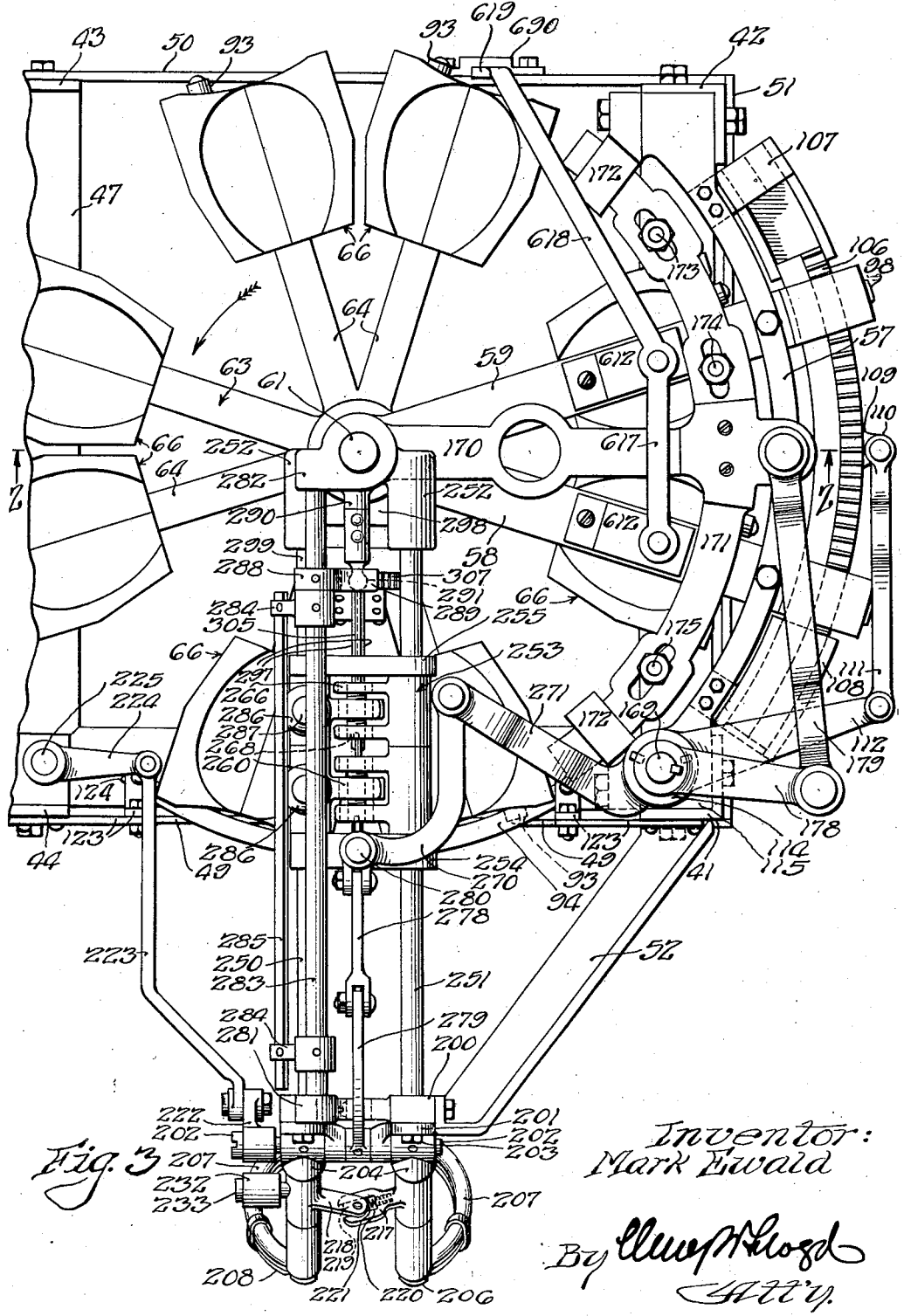
Figure 3 is a fragmentary top or plan view of a machine—like that illustrated in Figures 1 and 2.

Each of the members 45 and 47 is an angle iron in the present device. Strap members 49, 50 and 51 complete the assembly of the main frame, the various angle irons described and the strap members being bolted together to provide a substantially rigid structure for supporting the apparatus to be described.

Where the feeding apparatus, disclosed particularly in Figures 1 and 3, is employed, there is an obliquely disposed angle iron 52 which projects outwardly and upwardly from the vertical support 41 to support the fruit feeding instrumentality, which, in the device shown in Figures 1 and 3, is combined to operate with the splitting and paring mechanism comprising the main portion of the machine.

Such frame may be unitary, cast or otherwise formed. So long as of sufficient strength, it is quite immaterial how it is formed or produced.

The fruit cups

In the previously made application for Letters Patent of the applicant, fruit cups from the original form, through various developments leading to substantial perfection, have been illustrated. The present cup is substantially the same type of cup as that originally designed by the applicant. The present type of machine requires, for facilitating the loading of the cup, means for spreading the cup segments as an incident to the cup being loaded mechanically. Otherwise, the cup in the present apparatus is substantially the same cup as that which is described in the last previously filed application for Letters Patent.

A bracket 53, supported by two (or more) of the members 47, or otherwise disposed in the frame, provides a vertical bearing 56. Said bracket 53 includes arms 54 and lugs 55 which may be bolted or otherwise fastened to the frame members 47. Intermediate the uprights 41 and 42 of the frame, and adjacent their top, is an arcuate member 57, which has radial arms 58 and 59 extending to the center of the frame to provide an upper vertical bearing 60.

A vertical shaft 61 is mounted for oscillation in said bearings 56 and 60. Said shaft is secured against axial displacement by a collar 62, or other means for the prevention of such displacement may be provided.

Mounted for free rotations on the shaft 61 is a sleeve or spider 63, having arms 64 arranged in four pairs, the pairs being ninety degrees apart. Each arm 64 supports a cup in a cup bearing section 65, the cup just referred to being designated as a whole by the ordinal 66.

Each bearing section 65 has a vertical slot 67 therein, rectangular in cross-section, and coextensive longitudinally with the material of the bearing. Within the slot 67, a cup standard 68 is disposed for slidable movement. Each standard 68 has a transverse camming slot 69 adjacent to its lower end, and it has a bifurcated top portion defined by legs 70.

Each cup 66 includes two sections 71, sometimes called segments, which, when paired, form a generally hemispherical receptacle. Both ends of the cup segment material are cut straight across in alignment. The remaining cup portions of the two segments is bounded by a marginal flange 72. Where it is necessary to distinguish between segments 71 hereinafter, one will be referred to as the left-hand segment, and the other will be mentioned as the right-hand segment. This distinction will be founded on the relative position of said segments, as illustrated in Figures 13 and 15 of the drawings.

The left-hand segment 71, it will be noted, is of somewhat less depth than the right-hand section 71. As illustrated, the two segments 71 provide a hemispherical article holding means, dished to receive a split or halved fruit. In the present instance, the cups are shaped to accommodate a halved pear, in which the dividing split extends through the fruit from the stem end to the blossom end thereof. Other fruits than pears may be accommodated by substituting differently shaped segments 71.

From the body of left-hand segments 71 and at the outer end thereof there is a shank 73 which is complemental and opposed to a similar shank on the right-hand segment. From the rear side of one of said shanks 73 there may be a bifurcated arm 74, if the cup 66 is to be tilted for discharge. Said arm has fingers 75 and 76 the inside face of which fingers provides a camming surface used for dumping the cup 66, and for causing said cup to resume a horizontal position, mention of which dumping has heretofore been made in connection with the discharge of the fruit and peeling, or of the peeling alone, from the apparatus.

From the right-hand segment 71, a shank 77 depends, this being on the order of the upper section of shank 73 in extent, and being complemental and opposed thereto. Intermediate shank 73 on one side and shank 77 at the other side of cups 66 are pivot blocks 78. Each of these blocks 78 is in parallelism and comprises a generally rectangular member possessing a centrally disposed slot 79. Depending portions of shank 73 are on opposite edges of one pivot block 78 and like extensions of shank 77 are on opposite edges of the opposed pivot block 78. Said blocks being in pairs generally move together, but are capable of relative movement in the direction of their major dimension.

Segments 71 are mounted on pivot blocks 78 for spreading by the use of bolts 80, one bolt extending through the depending portions of the shank of one segment 71 and through the pivot block 78 associated therewith. Thus, a pivotal disposition for segment 71 is had whereby one segment 71 may move in an arcuate path relatively to the other segment.

To maintain segments 71 in a compact or adjacent position, a spring 81 is disposed intermediate shanks 73 and 77. Spring 81 at one end is seated in a depression or seat 82 in the left-hand segment and at its other end said spring 81 is seated in a similar depression or seat 82, which seats or depressions are aligned, opposed and complemental to one another. The spring 81 is generally a coil spring, and seats 82 are beneath the axis of rotation of segments 71 upon the bolts 80.

Segments 71 are spread by the pressure therein to accommodate oversized fruit. Said segments 71 are also forced apart during the paring operation, as will later be explained, and in the present form of device, the segments 71 are exploded or opened to receive fruit which is split in the machine, the filling of the cups 66 with mechanically split fruit being a step immediately following the splitting of the fruit.

The pivot blocks 78 which are disposed between or within the legs 70 of standard 68 are so mounted that said blocks 78 firmly but flexibly maintain the segments 71 in a normally horizontal position, but allow the segments 71 to be conjointly tilted to an angular position upon application of a positive camming force upon the depending leg 74. From the description of the apparatus so far given, it is perfectly manifest that the two segments 71, in such tilting movement, are adapted to be moved conjointly and not separately or independently of one another.

Each standard 68 receives the force necessary to lift a cup 66 to a paring position from its loading position and thereafter return it to a discharging elevation. Of course, in the present machine the cups are paired, and paired cups are moved conjointly. Likewise, the standard 68 affords a support for a cup 66, when the latter is being moved from horizontal to a discharging position, and from such discharging position to a horizontal or normal position.

By a combination of standard 68 with the bearing blocks 78, and the bearing blocks 78 with segments 71, relative vertical movement of the right-hand and left-hand segments 71 is had. Such movement facilitates loading of cups 66 and also compensates for the movement of the paring knives, as has already been mentioned.

In the open pivot block slot 79, in each of the paired pivot blocks 78, there is a rounded bottom 83. Across such rounded bottom 83, there is a bolt 84 having a flat side 85 on its shank. Said section may be formed by cutting away a portion of the periphery of the bolt shank, or by forming the bolt with an arcuate and not truly circular shank.

Bolt 84 is so anchored in the standard 68 by a pin 86 that the flat side 85 of the bolt shank is uppermost, but at an angle away from a truly horizontal plane. The preferred angle of obliqueness for the flat side 85 of bolt 84 is downwardly and inwardly toward the center of the machine.

In the paired slots 79, above the bolt 84, is a flat bottomed unitary keyway 87 which is coextensive with the paired pivot blocks 78. Above the keyway 87, and mounted in parallel pockets or seats 88 therein, are parallel spiral springs 89. The other end of each of said springs 89 is seated in a pocket 90 provided in pivot blocks 78 at the upper end of the slots 79 therein, hence, the springs 89 cannot readily be accidentally displaced.

When a greater pressure is exerted upon one of the segments 71 than upon the other of the segments 71, one of the springs 89 compresses under such pressure, allowing one segment 71 to move in a vertical path out of horizontal alignment with the other segment 71, such movement compensating for pressure disturbances or irregularities in a cup 66.

The keyway 87 maintains pivot blocks 78 in parallelism and causes angular movement imparted to one of these blocks 78 to be communicated to the other block 78. For these reasons, one segment 71 only is provided with a depending bifurcated camming shank 73. The legs 70 upon the standard 68 cooperate to keep the pivot blocks 78 in parallelism when the blocks are in either vertical or angular positions for there is always a large bearing surface of the legs 70 in contact with a considerable portion of the outer bearing surface of pivot blocks 78.

One block 78 cannot move angularly about the pivoting bolt 84 without a corresponding movement of the other pivot block 78 because of the snug fit of the keyway 87 in the slots 79 of each of the blocks 78.

In connection with the mechanical loading of the device, it has been found desirable to provide means for spreading the right and left-hand segments 71 conjointly as an incident to the placing of halved fruit thereinto. The amount of play between right and left-hand segments 71 is relatively slight. When there is mechanical loading, it is desirable to spread the segments and, in order to do this and to require their opening in unison and conjointly, each of said segments 71, in respect to the shank 73, is geared to the other, so that, when one segment 71 is angularly moved, say the left-hand segment, by force and a substantial distance, it will cause the opposite segment, the right-hand segment 71, to open. The gears or teeth in the shanks or lugs 73 are denoted 91 in Figures 13 and 14.

Where the apparatus is so arranged that there is no dumping of the fruit and peel, or of the peel alone, at the third or fourth stations, and the fruit is removed by the coring device and the peeling by flippers or other means, then the form of the cups 66 may be so modified that no parts necessary for tiling only may be included. This modification, of course, eliminates a number of parts, and does away with the tilting action by cams which will hereinafter be mentioned, and which may be made effective at either the third or the fourth section, for purposes mentioned. When such dumping is not had, however, the cups are arranged for spreading and for movement relative to one another in order to compensate for differently sized pears, for facilitating loading, and to accommodate the movement of the paring knives through the segments.

For mechanical loading, one segment 71 may be provided in its flange section 72 with a stud about which a roller rotates. Said roller at the first position engages a track cam.

Upon each of the left-hand segments 71 of cups 66 is such a lug 92 about which a roller 93 freely rotates. When cups 66 approach the loading station, rollers 93 engage a cam track 94 anchored upon the frame of the device, whereby the left-hand segment 71 of paired cups 66 is forced into an angular position. Track 94 is held in such position by a bracket 123 disposed upon said members 44 and 41. Said track 94 is provided with upturned ends 124 to permit of the ready engagement of the rollers 93 therewith and the smooth release of the rollers 93 therefrom without undue jar upon the cups 66, when rollers 93 shall have traveled the length of the track 94. As an incident to such forced opening of the left-hand segment 71, right-hand segment 71 is also angularly moved by the engagement of teeth 91, thus opening the cups 66 wide to readily receive fruit to be fed thereinto.

The opening of the cups 66 is arranged to occur while the split fruit is spread apart after being split, the rollers 93 disengaging the cam 94 immediately after the loading operation has been completed.

The paring mechanism

In the applicant's previously referred to applications for Letters Patent, the structure and details of a paring mechanism have been described and illustrated. The method of ridding the fruit of its peeling, which was found to be fundamentally correct as early as 1919, is the provision of a cup (see fruit cup 66) within which a halved fruit is deposited combined with a member which engages the flat or cut surface of the fruit to maintain it in such cup while a knife is adapted to travel through the cup adjacent to the wall thereof, the path of travel of such knife being through the meat of the fruit close to the skin so that only a small portion of pulp is removed with the skin. As fruit in any graded size is not all of the precise bulk, it is not always uniformly split, and this is particularly true when hand splitting is employed instead of machine splitting. The member or pad engaging the flat or cut surface of the pear or fruit necessarily must be resilient to compensate for the variations in the sizes of the held halved fruit.

There is a tendency for the fruit at times to adhere to such pad, and means should be provided for the purpose of insuring instant release of the fruit from the pad member engaging the flat surface of such fruit as soon as the cutting or paring operation is performed.

Several forms of apparatus for accomplishing the several results just mentioned have been described in the heretofore filed applications for Letters Patent of applicant. The present apparatus, for purposes of convenience, adopts generally one of these previously described forms. There is, however, a modification in the manner of applying force to the paring knives, which has a number of advantages over previously illustrated devices.

Figure 6:
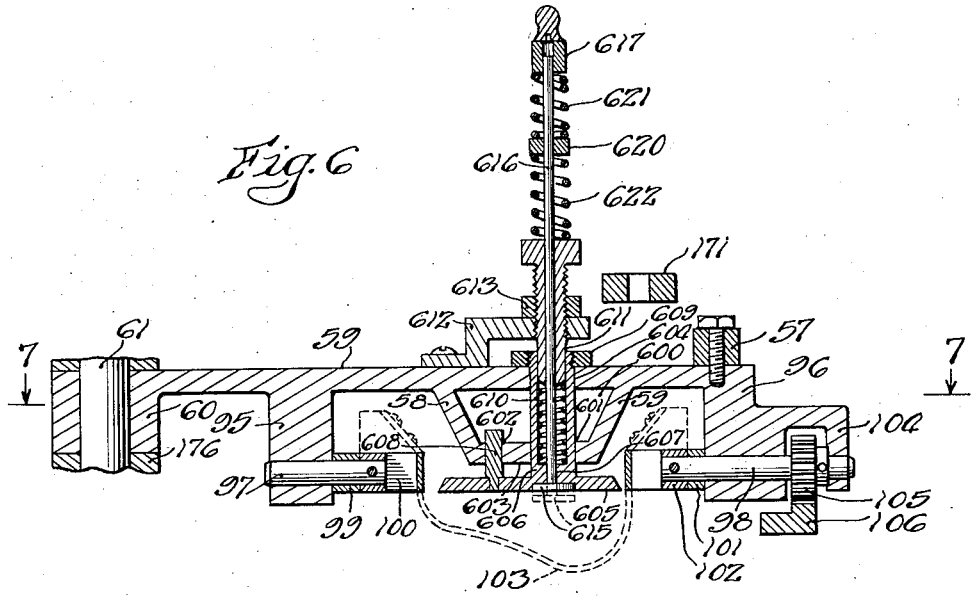
Figure 6 is a radial section through a fruit pad and slicing device and is taken on the line 6—6 of Figure 7.
Figure 7:
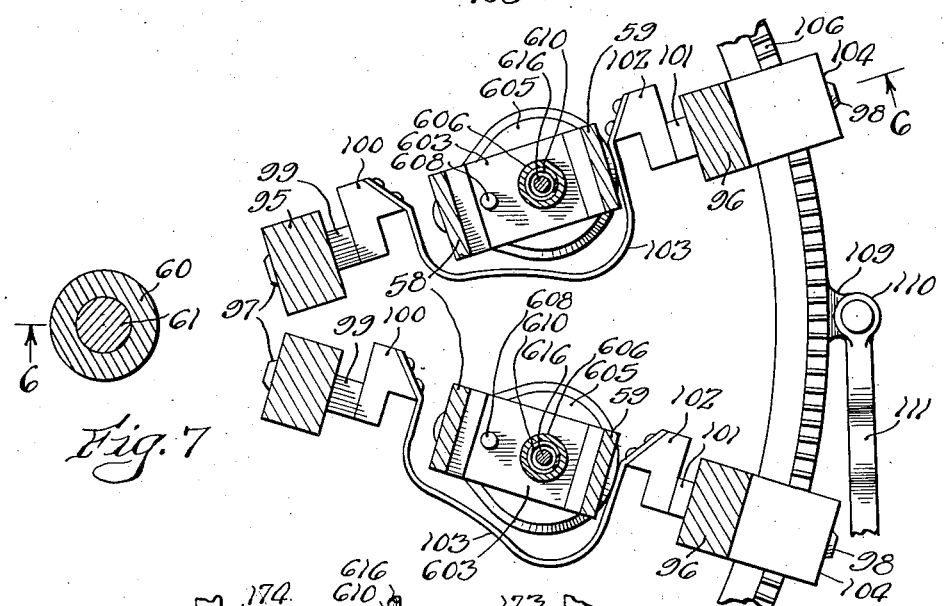
Figure 7 is a transverse section on the line 7—7 of Figure 6.
Figure 8:
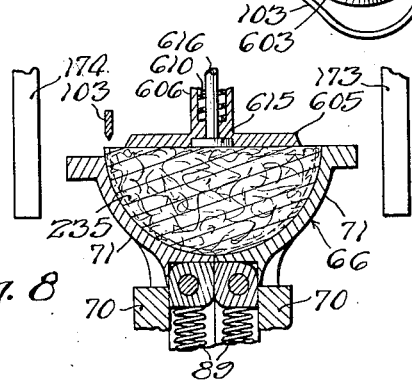
Figure 8 is a transverse section through a fruit cup, the paring knives and fruit pad being shown fragmentarily.

As previously pointed out, an arcuate support 57 is disposed between the members 41 and 42 and has radial arms 58 and 59, and provides a bearing 60 for the vertical shaft 61 (see Figures 2, 6 and 7).

Each arm 58 and 59 is substantially identical. The two arms may be formed as a single member which is bolted or otherwise secured, if not integral therewith, to the arcuate frame member 57. Members 58 and 59 have a flat top surface from which depend downwardly two lugs 95 and 96, which form horizontal bearings for stub shafts 97 and 98.

Shaft 97 is feathered or keyed in lug 95 and has thereon a separator 99. Adjacent the separator 99 is a knife block 100 which rotates with shaft 97.

Shaft 98 carries a separator or sleeve 101 and a knife block 102 which latter is secured to the shaft 98. Intermediate lugs 96 and a lug 104 depending therefrom, shaft 98 is provided with a gear wheel or pinion 105 which is in engagement with a rack 106 adapted to move in horizontal plane to the right and to the left between uprights 41 and 42, there being supports 107 and 108 therefor in said uprights 41 and 42.

Rack 106 is so moved by the driving mechanism that it operates in synchronism with the remainder of the apparatus, as will now be pointed out.

Secured to the center and outer edge of rack 106 is an arm or standard 109 which terminates in a lug 110. About the lug 110 is a link 111 having one end freely rotatable on said lug 110. The other end of the link 111 is journalled about a lever 112, lever 112 being keyed to a vertical shaft 114, the latter being one of the concentric shafts journalled in support 115 disposed in the angle iron vertical frame member 41. Said shaft 114 also actuates a lever 271 employed to operate one form of the loading devices and the slicer carriage.

By proper timing, the paring mechanism is actuated each time and immediately after fruit held in two of the paired cups 66 is lifted upwardly to a paring position and while being held in engagement with fruit pads engaging the flat or cut surface of the fruit. The pads will be later described.

The paring knives 103 which are on the blocks 100 and 102 are moved in a counterclockwise direction at this time through the fruit cups 66. After this the fruit cups 66 drop, for advancement to the next succeeding position, the third position. The paring mechanism is reversed immediately the cups 66 drop by a clockwise movement of the knives 103 to a position which they maintain until the next pair of fruit cups 66 is brought forwardly and upwardly for a repetition of the just described operation.

The paring mechanism completes four complete cycles of operation for each complete rotation of the cup holder. Each time that said holder makes a complete rotation carrying with it the four sets of paired cups 66, the paring mechanism operates four times, each time upon fruit in two of the paired cups 66, and between each active operation and the next succeeding operation, the paring mechanism returns to its normal position. The movement of the knife or return is through the atmosphere, the paired cups 66 containing fruit having dropped out of possible engagement therewith anterior to the return movement.

*The loading mechanism*

Upon the upright 41, there is an oblique member 52 and between said member and upright 44 there is a transverse member 49. One form of loading mechanism is secured in part to these frame members. Such loading mechanism is illustrated in Figure 1, and cooperates with a fruit splitting mechanism. The loading member so shown is partially dependent upon the parts of said splitting mechanism for support.

The loading mechanism includes a transverse frame 200 secured to angle iron 52. Brackets 201 project therefrom and have a transverse shaft 202 journalled therein. Bolts 203 are used to secure lugs 201 to frame 200. Keyed to shaft 202 are bosses 204. Into said bosses 204, bolts 205 having heads 206 are threaded.

Bolts 205 provide supports for two pairs of opposed fruit holding arms, 207 and 208. The smaller and shorter pair of arms 207 are adapted to surround the larger section of the fruit when it is of an irregular shape, like that of a pear. The arms 207 in each smaller pair are divided into a bearing section 209, an elbow section 210 projecting therefrom, a straight or main section 211, and a fruit engaging portion 212. Section 212 engages the fruit, such as a pear, about the fruit's larger diameter, and somewhat removed from the blossom end.

Upon each bolt 205 external to the smaller of fruit engaging members 207 is one of the second pair of fruit engaging members 208. Each member 208 has a straight section 213 parallel to section 211 of the smaller pair, and an inwardly projecting section 214 to receive the small end of a pear adjacent its stem end. It also has a bearing section 216 which rotates on bolt 205. Members 207 and 208 are loosely strapped together along their parallel sections 213 and 211 by clips 215 which allow slight play therebetween. Such clips 215 will cause one pair of arms to move with the other pair when there is a material angular displacement of one or the other, but will allow adjustments therebetween to accommodate irregular sizes and shapes of pears. The head 206 on bolt 205 causes the bearing portions 209 and 216 of members 207 and 208 to be held in alignment, these bearing portions being maintained between bolt head 206 and boss 204.

Intermediate the bearings 209 of the smaller members 207 are angularly disposed fingers, one finger 217 having a slotted end and the other 218 a lug. Upon the lug is a shoe 219 which rides in a track 220 in the slotted end of member 217.

Intermediate the bottom of the slot in member 217 and the shoe 219 is a spring 221 so located so that it will not be accidentally displaced, and so that it will constantly urge the jaws formed by opposed members 207 towards one another.

Loosely mounted upon one end of the shaft 202 is a lever 222 which at its free end is secured to a link 223. Link 223 is actuated by a lever 224 keyed to a vertical shaft 225, secured in vertical frame member 44 by suitable bearing blocks.

Shaft 225 is actuated by a lever 226 which is pivoted to a link 227 upon which is pivoted a vertical link 229 which is pivoted at 230 to a bracket 228 secured to frame member 43. At its bottom, link 229 carries a roller 231 which rides on a peripheral cam 234 rotated concurrently with the driving shaft.

On one of the members 207 is a roller 232 which rides on a lug 233 projecting therefrom. Movement of this one member 207 causes both arms 207 and arms 208, which are linked thereto by clips 215 also to move. Opposed arms 207 are connected for opposed concurrent movement by the interlocking fingers 217 and 218.

Hence, movement of shaft 225 forces the paired arms 207 and 208 to move from the closed position shown in Figure 1 to an open position, this opening being concurrent with the delivery of a pear to the slicing mechanism, such open position being maintained until the arms 207 and 208 are clear of the carrier for the slicing device, the action of shaft 225 being to force the lever 222 against the roller 232, thus moving one of the bearing parts 209 outwardly, concurrently moving the remaining bearing parts 209 and 216.

The members 207 and 208, when in the position shown in Figure 3, are ready to receive fruit 235, stem end down. By a movement later to be described, the arms 207 and 208 are moved inwardly in an arcuate path around shaft 202. The fruit 235 is carried until it has attained the discharging position. The arms 207 and 208 are maintained close together and support the fruit 235 somewhat loosely during this arcuate inward movement.

When the fruit 235 is discharged into the splitting device, by the movement hereinabove just described, the arms 207 and 208 are conjointly separated, as the lever 222 is forced to engage the roller 232 on one of the arms 207. This opening action occurs while the arms 207 and 208 are in innermost position. Movement of this one arm 207 causes the arm 208 linked thereto to move with it, and the opposed arms 207 and 208 are separated by the interlocking sections 217 and 218 on arms 207.

In the cycle of operations, the next succeeding step is the return of the opened arms 207 and 208 to loading position, such arms on their return closing with the change of the periphery of cam 234.

Movement of shaft 202 in an intermittent manner to move the arms 207 and 208 from the position shown in Figure 3 to the position illustrated in Figure 1, and vice versa, may be obtained from a sliding carriage which engages the fruit 235 during the splitting thereof.

The splitting apparatus illustrated in the present application projects from the center of the device outwardly between the uprights 44 and 41 and is concurrently supported with the loading device by the oblique frame member 52. The slicing device includes a two-rod track, the two rods being designated 250 and 251, the outer end thereof terminating in the transverse member 200 supported by said oblique member 52.

The inner ends of the rods 250 and 251 are seated in a bifurcated collar member 252 disposed about shaft 61, and resting above the radial arms 58 and 59. On said tracks 250 and 251 is a carriage 253 comprising end members 254 and 255 suitably linked together. Intermediate the end members 254 and 255 are fruit carrying jaws, as shown in Figures 1 and 3. The inner faces of the said jaws are shaped as is shown in Figure 25, to firmly but not destructively secure a fruit 235 therebetween. The jaws, as will later be noted, are resiliently disposed in respect to opposed members. Intermediate such opposed jaws is a spring which firmly tends to force the jaws together but without such force as to damage a fruit, even a very ripe pear, held therebetween. Of course, the present form of jaws may be changed materially and yet serve the instant purpose, the lugs 266 being interlaced with the lugs 260 as is shown in Figure 3.

Referring to Figure 25, in conjunction with Figures 1 and 3, it will be noted that the left hand jaws 256 ride upon a sleeve 257 which rides upon track 250. The sleeve 257 unites members 254 and 255 at one side, and freely rotates therein, and on said sleeve jaw members 256 are firmly secured. Each member 256 includes a leg 258 terminating in an inwardly facing triangular fruit engaging portion 259. At a right angle to the leg 258 is a lug 260 having a slotted end 261.

Opposed to members 256 are the right hand members 262 which are secured to a sleeve 263, said sleeve maintaining end members 254 and 255 together but riding freely therein. Each member 262 has a leg 264 and a fruit holding part 265 corresponding to parts 258 and 259 of the opposed jaw member.

Members 262 have inwardly projecting lugs 266.

The lugs 260 are slotted at 261, as stated, to carry a block 267. The block 267 is so secured in the slot 261 that it rides freely therein while it is rotatively secured to a bolt 268 which is rotatably disposed in lugs 266, so that movement of one jaw 256 causes movement of the jaw 256 paired to it and also of the opposed jaws 262.

The jaws 256 and 262 are thus made to possess conjoint movement, and the spreading of one jaw causes a corresponding spreading of the opposed jaw. A spring 269, one end being in one member 256 and the other on a member 262, tends to keep the said jaws in closed position at all times except when mechanically urged apart.

Sliding movement of the carriage 253 is had on the track 250 and 251 through the agency of a curved link 270 pivoted to end member 254, the other end of said link 270 being pivoted to a lever 271 secured to the shaft 114 journalled in supports in post 41.

Shaft 114 is the outer member of two sleeved shafts secured in post 41. At its lower end it carries a lever 273 which is linked by member 274 to a V-member 275 riding on shaft 61, said member 275 being actuated by a link 276 driven by a cam 277 on the driving shaft.

Intermediate carriage 253 and shaft 202 in the frame 200 are two links 278 and 279, the link 279 being keyed to the shaft 202 with its free end pivoted to the other link 278 which in turn is pivoted to the bosses 280 in the end 254 of carriage 253.

Movement of the carriage 253 to the outside of the apparatus causes the jaws 207 and 208 to move from the position shown in Figure 1 to the position shown in Figure 3, and vice versa. The jaws 207 and 208 are opened just prior to and during a part of the return journey thereof to the position shown in Figure 3, as previously described.

Above the track comprising the rods 250 and 251 and mounted at one end upon a bracket 281 dependent upon the tie rod 200, and in the other in a collar 282 riding freely on shaft 61 is a single rod 283, which oscillates freely in its supporting members. Said rod 283 has two lugs 284 depending thereupon and keyed thereto which lugs 284 support a strap 285. The strap 285 engages two roller knobs 286 mounted upon the left-hand set of jaws 256, and normally the knobs 286 which rotate on lugs 287 screwed into jaws 256 rest against said strap 285. The weight of the strap 285 is insufficient to open the jaws 256 and 262 against the retarding force of the springs 269.

The rod member 283 has secured thereto a lever 288 having a bifurcated end 289 forming a seat in which a lever 290 having a ball end 291 and secured to a collar 292 actuated by shaft 61 rides. The lever 290 terminates in such ball member 291 which normally extends into the seat in member 289.

In timed relation lever 290 is moved with the shaft 61 opening the jaws 256 and 262. This occurs when the fruit is split. Said jaws 256 and 262 are kept open from the time a fruit 235 is split until the carriage 253 is moved outwardly its external limit, when the jaws 256 and 262 are allowed to close about a fruit 235 in the paired arms 207 and 208. This occurs when said arms 207 and 208 are in their innermost and uppermost position. The jaws 256 and 252 remain closed until the fruit 235 therein is completely split.

The movement of the carriage 253 outwardly and inwardly has been described. The shaft 114 is operated intermittently producing oscillating movement of said carriage 253 from its outermost extremity to its innermost extremity, the several connecting members between the shaft 114 and carriage 253 compensating for the linear movement of the carriage 253 and the arcuate movement of the lever 271.

Because of the linking the end member 254 of the carriage 253 to the said feeding apparatus, the feeding apparatus and the carriage are made to operate in synchronism, so that, after a pear is loaded into arms 207 and 208, it is conveyed to the jaws 256 and 262 for the slicer, and by such jaws 256 and 262 past a knife by which the pear so held is halved.

The splitting device

As the carriage 253 carries the fruit 235 inwardly in a horizontal plane, said carriage 253 holding the fruit in the jaws 256 and 262 forces the fruit past a splitting knife 293 where such fruit is split longitudinally and through the center of its core. The splitting knife 293 has a substantially straight front cutting edge, and an irregularly shaped rear edge which is adapted to reach to a point adjacent to a pair of wings used for spreading the fruit after it has been split. Said knife is secured by a lug 294 thereon to a strap member 295 by a bolt 296 passing therethrough, said strap member 295 being intermediate members 44 and 41.

A pear is split by the knife 293 by being forced past such blade 293 by carriage 253. As it is split, it is partly spread by the knife 293 so that, as it travels further towards the central shaft 61, it is forced longitudinally of a pair of flat wings 297. The fruit, when it is forced over said wings, is still within the grip of the resilient jaws 256 and 262.

Said wings 297 are pivoted in a collar 298 having a bracket 299 projecting therefrom, the mounting for said wings 297 comprising an angled member 300 having a shaft portion 301 journalled in said collar and bracket. Above member 298 is a collar 302 which has a lug 303 through which a bolt 304 extends into collar 298 to secure it against rotation, there being an arm 305 extending from collar 302 to the loading mechanism where it is firmly anchored so that neither collar 298 nor collar 302 may rotate.

The wings 297 have at their innermost ends bolts 306 by which they are secured to the angled member 300, the two shaft portions 301 being mounted horizontally and in parallelism. Said shafts 301 are keyed against displacement by a feather running intermediate the collar 298 and the bracket 299.

On said shafts 301 are gears 307 which are enmeshed so that the wings 297 move in unison toward and away from one another. In normal position, the wings 297 are flat against one another. When spread, they are forced apart conjointly and equally, and assume at their extended position, a substantially aligned and horizontal position, the two surfaces being in a horizontal plane above the fruit cups 66.

For actuating the wings 297 from the first of said positions to the second, and to return said wings 297 from the second position to the first, a segmental gear 308 engages one of the wing gears 307. Said segmental gear is pivoted upon a bolt 309 threaded into bracket 299. The under side of the segment 308 terminates in a ball end 310 which is rocked by a collar 311 attached to shaft 61 and having a bifurcated lug 312 projecting therefrom, the ball 310 being between the arms of said lug. The structure is plainly shown in Figure 26.
As the shaft 61 oscillates, collar 311 is rocked in proper synchronism with the loading mechanism. Said collar 311 at the proper time forces the wings 297 apart about an arcuate path, each moving approximately ninety degrees, and from an impinging vertical position to separate horizontal alignment. The reverse movement of the wings 297 is obtained by the oscillation of the shaft 61, so that the wings 297 are returned to their normal position.
The opening of the wings 297 closely follows the opening of the jaws 256 and 262 of the carriage 253, so that a halved pear by the knife 293 is spread apart as said jaws 256 and 262 release their grip upon periphery of the pear when divided into halves. Likewise, the spreading of wings 297 is accomplished while the segmental cups 66 are spread apart by reason of the roller 93 upon one segment of said cups 66 engaging the track 94 upon the side of the frame intermediate the parts 41 and 44.

The opening of the jaws 256 and 266 is such that they are not impinged or struck by the wings 297, and the wings 297 return to their normal vertical position before the jaws 256 and
262 are again traveling inwardly upon the tracks
250 and 251 with another fruit 235.

Stem clipping loader

Figures 27 and 28 illustrate a different type of loading machine from that shown in relation to the Figures 1 to 26, inclusive. Such different apparatus is used to take the place of the loading device shown particularly in Figures 1 and 3.

Upon a standard 500 secured to frame members 44 and 41 by braces or brackets 501 is the main portion of the apparatus. Upon such standard 500 and mounted in a manner later to be described is a platform 502 having a heel 503 against which the fruit 235 is adapted to rest at its larger end. In said platform 502 is a rod 504 having a head 505, between which head 505 and the platform 502 there is coiled a spring 506. Knives 507 of crescent shape are mounted at the other end of the stem 504 for oscillating transverse parallel movement. Said knives 507 are pivoted about the stem 504, and depending from their hook shaped blades is a flange 508, as is shown in Figure 28. The knives 507 are mounted in close contact with their shearing edges in alignment. Adjacent to each knife is a suitable collar 509 riding upon the stem 405, the collars 509, blades 507, and a screw 510 extending into stem 504 completing an assembly at the inner end of stem 504, so that said blades are held in contacting position thereon and move as a unit with said stem when an oversize fruit is placed on the platform 502.

Each of said knives 507, by its wing 508, is connected to a link 511, the other end of the links 511 being held about a common pivot, a screw 512 projecting through a short coupling 513 which has a horizontal pin 514 projecting from each side thereof into a link 515, which link 515 has a horizontally disposed, elongated slot 516 therethrough.
As said pin 514 rides in slot 516 in the link 515, it may travel from one end of said slot to the other to compensate for movement of the knife unit with stem 502. Stem 502 is always urged to the left of Figure 27 but moves readily to the right when the stem of an oversize fruit is forced between the cutting edges of blades 507.

Said link 515 is adapted to reciprocate vertically through a bearing block 517 which is bolted or otherwise secured to standard 500.
Mounted intermediate the upright members 44 and 41 is a bell crank lever 518 pivoted on a horizontal bearing 519, the outermost end of said lever having an elongated bearing slot 520 in which a pin 521 secured to the link 515 is adapted to ride. The other end of said bell crank lever 518 is pivotally connected to a coupling 522 by which a rod 523, which corresponds to the rod 227 operating the cam opening the loading jaws in the previously described loading device. Said rod 523 is actuated in the same manner as the rod 227 previously described.

The block 502 has a depending portion 524 in which is formed a rectangular slot 525 extending vertically toward the body of the block or platform 502. Inserted into said slot 525 is the standard 500 from which depends the bearing block 517.

Intermediate said depending portion 524 of the block 502 and a lug or stud 526 disposed upon the standard 500 is a spring rod 527 which is anchored in depending section 524. Said rod 527 rides freely through the lug 526, an adjusting nut being carried on the rod 527 beneath said lug 526, about the spring rod 527. Between the depending portion 524 and said lug 526 is a coil spring 529 which is adapted to urge the block 502 and the appendant parts upwardly. Said spring 529 urges the block upwardly to the limit defined by the nut 528 which nut provides means for close adjustment of the platform 502 relatively to the splitting device and carriage therefor, both of which have heretofore been fully described. Platform 502 is disposed so that jaws 256 and 262 surround the fruit 235 on platform 502 just prior to the actuation of knives 507.

By adjusting the nut 528, the position of the platform 502 and attendant parts may be regulated to accommodate or provide enough play so that varying sized or shaped pears may be accommodated on a single platform. All of such pears are adapted to rest upon the platform 502 against the heel 503. The knives 507 and the various operating members are mounted to be moved toward the machine to accommodate oversized fruit. The knives 507 move inwardly in conjunction one with another because they are resiliently mounted upon the stems 504. There is play between the link 515 and the coupler 513 and the lever 518.

A pear 235 having been fed into the device and the machine being in operation, movement of the rod 523 operates the bell crank lever 518 to actuate the links 515 and 511 whereby the knives 507 are pulled sharply across the end of a pear 235 on platform 502, removing the stem end portion which falls to one side. Just previously, the jaws 256 and 262 traveling upon the track 250 and 251 have closed about the pear and are ready to convey the pear with its end removed into the machine and past the splitting knife, also previously described.

After the cutting stroke of the blades 507 is completed, the bell crank lever 518 continues to draw downwardly upon the link 515, drawing the platform 502 down, say a fraction of an inch or more, to give clearance for the passing of the jaws 556 and 562 as they begin to move the pear inwardly. This pulling action compresses the spring 529 which spring forces the return of the entire assembly relating to platform 502 to its original position as soon as the pairs of jaws 556 and 562, have traveled inwardly a sufficient distance to clear the loading platform assembly just described.

The operations just outlined are repeated with each succeeding fruit, and, of course, as indicated before, a single loading device attached to the machine in the manner herein indicated may be converted into a turntable device adapted to rotate by intermittent motion bringing pears one at a time into a position to be gripped by the jaws 256 and 262, the knife operating mechanism being adapted to actuate the knives 507 concurrently with the closing of the jaws 256 and 262 of the fruit splitting apparatus.

Cup lifting and dumping

Prior to the actuation of the paring knives 103, and as an incident to movement of a pair of cups 66 from the first position to the second position, the pair of cups 66 containing halves of fruit are brought into vertical registry with the pads 605.

In the course of travel, the bifurcated holder 68, which has a grooved lower end 69, has slidingly passed into engagement with cam shoes on an arm actuated by the cup lifting cam.

Said shoes 180 are adapted to ride in the transverse groove 69 in the bottom of the cup supporting stem 68 somewhat loosely to avoid binding but securely enough to always provide for positive actuation.

Shoes 180 are at the end of an adjustable stem 183 which stem in respect to both cups 66 is seated in a horizontal arm 184 forming a part of a cam yoke 185 actuated in a vertically reciprocating manner by a cam 186 driven by the cam shaft 121. The cup lifting cam may be arranged at any point on the cam shaft 121 but is preferably placed in juxtaposition to the cup shifting cam.

By rotation of shaft 121, the cam 186 is actuated whereby the yoke 185 rises and falls and with it the arm 184 of the cup lifting cam, which arm or bar is adapted to register with the grooves 69 in said stems 68.

The cup lifting cam 186 forces the cups 66 upwardly and then downwardly, by positive movement, maintaining the cups 66 in an elevated position at the second station for sufficient time to permit of the removal of the skins of the fruit contained therein. When the fruit and skins are removed, the cups 66 are forced downwardly, all prior to further rotation of the spider 63.

At one of the subsequent positions, 3 or 4, the pears with the skins detached may be thrown from the cups 66. This is accomplished in the following manner. The stems 68, as they attain the selected station, register their grooves 69 about extensions 187 in a bracket 188 above the Geneva gear, shortly to be described, whereby, while being descharged said cups 66 cannot be lifted and cannot move in alignment with the lifting force used to tilt them.

A lever 189 which may be actuated with cup lifting cam 186 and which may form a member moving with or comprising a part of cam yoke 185 is adapted to move upwardly with yoke 185 to incline the cups 66 from which the peeled articles therein contained are discharged onto a belt or other conveyor. Such member 189 is provided with two arms 190, one for each cup 66 in discharging position each of said arms having a roller 191 which is adapted to impinge the finger of arm 74 as it rises. On the dropping of lever 189, the rollers 191 will impinge the opposite finger 76 of the forked member 74 to restore the cup 66 to a horizontal position.

The fruit pads

In removing the epidermis from articles placed in the sustaining members or cups 71, it is necessary to provide some means to maintain the articles therein against rotative movement.

Reference will now be had to Figures 1, 2, 3, 6, 7 and 8, which illustrate in detail a mechanically actuated floating pad assembly.

In such form of the invention, there is a radial arm 170 which is bolted to an arcuate sliding frame member 171 which extends from and reciprocates in shoes 172 in uprights 41 and 42. Member 170 oscillates around top of shaft 61. Beneath member 170 is the pair of angularly disposed radially extending brackets 58 and 59 suspended intermediate the center of the device and the frame members 41 and 42 by the transverse arcuate frame member 57. Said radial brackets 58 and 59, above the spider 63, provide the support for the vertical upper bearing 60 of the shaft 61. Beneath said bearing 60 is a collar 176.

As shown, the shaft 61 projects entirely through the bearing 60 and above the arm 170. The extremity of the shaft 61 is provided with a collar 181 detachably fixed thereto by a set screw 182 of standard construction.

It has been noted that the legs 58 and 59 are so related that they correspond with the spacing of each pair of article sustaining members 66. Upon each of said legs there is provided a frame or housing which is used to support the paring mechanism.

Intermediate the ends of the members 58 and 59 is a depending pan-shaped sub-housing 600, having two apertures 601 and 602 through the bottom face 603 thereof. Through the larger aperture 601 and through an aligned opening 604 in each leg 58 and 59, a pad 605, having a tubular upward extension 606, is reciprocally mounted. The pad 605 has a substantially central aperture 607 therethrough, such aperture being axial with the tube 606 but smaller. A stem or lug 608 is adapted to be inserted into aperture 602 in sub-housing bottom 603. Perfect alignments of pad 605 with the cups is thus maintained.

The pad 605 is shaped to correspond with the peripheral edge of the concavity of cups 66 but is slightly smaller in size with respect thereto to permit the knife 103 to travel freely thereabout. The pad 605 may be cast in one piece in different sizes with its hollow stem 606 of uniform size. Said stem, as indicated, is mounted to reciprocate vertically in its supporting frame. A nut 609 is threaded to the top of the stem 606 to permit the face of the pad 605 to be held in a position below normal. This is to take care of a piece of fruit that may be split in two above or below its longitudinal axis. In this way compensation is arranged for oversize or undersize halves of fruit.

A compression coil spring 610 is placed in the hollow stem 606 to give a downward pressure upon the pad 605. This spring may not urge the pad beyond the limit provided by nut 609. The upper end of the coil spring 610 is in contact with a hollow adjusting tube 611, adjustably mounted on a bracket 612 secured to the top of each leg 58 or 59, and is locked in position with a lock nut 613 bearing against said bracket.

By the adjustment of the tube 611, proper tension may be applied to the spring 610 upon the pad 605 whereby to allow certain relative action with respect to the springs in the fruit cups 66.

Through the recess 607 in the pad 605, a small generally round knockout pad 615 is fitted. To such pad 615 a stem 616 is made fast. Said stem 616 passes up through the pad tube 606, the spring nut 609, and a bar 617 crossing the top of the machine. Said bar 617 is connected to the L-like extension 618 on a vertical link or arm 619 which receives its downward motion from a cam, later to be described.

Upon the stem 616 is a collar 620 which is pinned in place. Above said collar 620 is a coil spring 621, and below said collar 620 is a second coil spring 622. If the floating pad 605 is lifted above its normal position of rest when a half portion of fruit contained in a cup 66 is brought into the peeling position, the spring 621 compresses, which allows the small knockout pad 615 to rise with the pad 605.

A little before the knife 103 finishes its peeling stroke, the bar 617 moves downwardly, with the arm 619 exerting an added pressure on the face of the half portion of the fruit which holds it firm in the cup until the knife 103 finishes its cut. After the knife 103 completes its cutting stroke, the bar 617 continues its downward motion in timed relation with the downward motion of the cups 66, thereby insuring a quick relief of the fruit from the pad 605.

When the bar 617 rises to its normal position, the springs 621 and 622 act upon the knockout pad 615 to draw the knockout pad up into the pad 605.

When the corer, hereinafter to be described, is employed, it employs as a part thereof the same cam as is used to mechanically actuate the knockout pad, and, therefore, it is usual, when such corer is used, to eliminate the mechanically actuated floating pad just described in favor of a floating pad which employs spring tension only for its effectiveness, thus eliminating a number of parts.

*Side cup movement*

Conjointly with the peeling operation, the cups 66 are moved sidewise, first in one direction and then oppositely, in order to keep the knife 103 in juxtaposition to the wall of cup 66 to provide for the removal of but as little as possible of the flesh of the fruit with the skin severed by the knives 103.

In the present disclosure, as heretofore indicated, the pear cups 66 are forced mechanically into a side sweep which side motion is slight but of material assistance in procuring a thin paring.

Reference should now be had to the cup shifting mechanism. Figures 16 to 20, inclusive, illustrate such side shifting mechanism for the cups 66 and the effect thereof in relation to the cups 66 and knives 103. The lower numbered Figures 1 and 3, show the general arrangement of such cup shifting instrumentality.

On the transverse cam shaft 121 is placed a cup shift cam 165, which cam transmits to a cam yoke 166 the motions required for this part of the device. These motions are transmitted through a link 167, a lever 168, a vertical shaft 169, which shaft is supported by two bearings 177, a second lever 178, and a link 179, to the anchor-shaped bracket comprising members 170 and 171, the latter being rotatable upon the central shaft 61 of the machine. At each end said members are slidably mounted in the shoes 172 supported by members 41 and 42. Adjustably disposed in said members 170 and 171 are three fins, 173, 174, and 175, each of which is disposed in a slot and is secured by a locking nut. Said fins 173, 174, and 175 are brought into contact with the periphery of the cups 66 and move them sidewise as illustrated in Figures 16 to 20, inclusive. In said views, but one cup 66 only is shown, but the cups 66 in the device actually in use are acted upon conjointly and by the same mechanism.

The fins 173 and 174 are normally in the position shown in Figure 16, at the time the cups 66 are elevated, thus allowing sufficient clearance for the cup 66 containing a half portion of fruit to be peeled until it attains a position for peeling. At the moment the cup 66 has reached its uppermost position, which is against the pads 605, the fins 173 and 174 are moved over to the position, as shown in Figure 17. By proper setting of the fin 173 in the slot provided therefor, the knife 103 may be made to enter the fruit at any desired point with respect to the thickness of the peeling to be taken from the fruit.

When the knife 103 shall have entered the fruit and during the interval that the knife 103 passes downwardly to the position shown in Figure 18, the fins 173 and 174 are moved in the opposite direction quickly to the position shown. At this time the cup 66 is moved sidewise by the fin 174.

During the time the knife 103 is at the bottom part of the stroke or between the positions shown in Figures 18 and 19, until the knife 103 passes from the fruit, there is no further movement of the cup (see Figures 18, 19 and 20). As soon as the knife 103 passes from the fruit, the fins 173, 174 and 175 are moved back into their normal position, as shown in Figure 16.

As the cup 66 is moved to compensate for the travel of the knife 103, is is possible to have a tolerance of at least 3/8 of an inch in the diameter of the pears peeled in a single cup in the grading thereof for size. The right-hand half segment 71 is approximately 1/8 of an inch higher structurally than the left-hand segment 71. This is desirable to give to the fruit an additional support as the knife finishes its paring cut. In use, it results in a very sharp or clean cut edge upon the pared fruit.

Grading of fruit is important in machine peeling, and until the invention of the cup shifting mechanism, while there has been relative flexibility in the cup structures, the grading of the fruit had to be more accurate than for use in the present device, otherwise many improperly peeled pears were developed. By the present arrangement, however, much greater tolerance is permitted. This reduces the necessity for a large number of different knives and cups, and necessarily reduces the investment of the canner in pear peeling machinery.

The coring device

In adapting the present apparatus to the type of corer herein shown, a modification of the knock-out device heretofore used may be employed. Instead of employing a knock-out device operated by a cam and springs, as has been described, a knock-out comprising springs like 610 and 622 in which the tension is correctly adjusted, is disposed around rod 616 for proper cooperation with the two floating pads, the apparatus being much like that already described, except that pads normally are more lowly disposed. The cam illustrated in the earlier figures in the present case and described for the operation of the knock-out is employed in the present coring device in a manner to be hereinafter indicated.

Reference should be had particularly to Figures 29, 30 and 31. The coring apparatus is normally disposed at the third station, that is, between the uprights 42 and 43. Upon each of the legs 42 and 43 is a U-shaped member or two-legged bracket 401. Each bracket is secured to the said members by bolts or the like. Each bracket 401 has legs 402 and 403 which provide a pivot or bearing for apparatus to be described. One bracket is a right-hand member, and the other is a left-hand member, the two being complemental and opposed. The coring apparatus is disposed intermediate said opposed complemental brackets.

In the present form of apparatus, the coring device comprises a pair of corers operating in unison, and these paired devices are arranged complemental to the paired cups 66.

The first portion of the coring device to be described will be the parts which cause said corers to move into the machine, and to move outwardly therefrom. The normal or rest position of the device is substantially that shown in Figure 29, except that the coring scoops normally are disposed at a slightly higher elevation so that they will not be engaged by the paired fruit cups 66, as such cups are rotated into position thereunderneath.

In each of legs 402 is a shaft 404. At the end of said shafts 404 are cranks 405. Intermediate the opposite end of cranks 405 is a shaft 406. For actuating the shafts 406, there is an arm 407 integral with one of cranks 405. Connected to the arm 407 is a link 408 which is connected at pivot 409 to a cam, which has been described and which is adapted to raise and lower the fruit cups 66.

Disposed in each of bracket legs 403 is a shaft 410. Connected to the shaft 410 is a link 411. Intermediate the ends of the links 411 is a shaft 412 which shaft normally operates with its axis above the axis of the shaft 406 and in substantially the same perpendicular plane.

Around the shaft 406 and intermediate the corer supports is a block 413. Said block 413 rides in a U-shaped end 414 of a guide member 415 which floats freely on the shaft 412. Depending from each end of the block 413 is a housing 416 about which the core removing mechanism is disposed, each member 416 riding freely on the shaft 406.

Projecting from the shaft 412 and riding freely thereon is a bracket 417 which has a projecting boss 418, in which a vertical shaft 419 is secured. The rear portion of the member 417 includes a sleeve 420 through which the shaft 419 may slidingly be moved.

Upon each side of the member 416 and secured thereto by machine screws or otherwise are two brackets 421. Between the brackets 421 and pivotally secured thereto are complemental opposed substantially hemispherical scoops 422, the point of pivoting being indicated by the numeral 423.

On the back of each of the cups 422 is a boss 424 which provides a support for a link 425, which is secured to the shaft 419. Shaft 419 being movable relatively to the housing 416, its movement downwardly through the sleeve portion 420 thereof causes the hemispherical cups 422 to approach one another to a closed position, while movement in the opposite direction of the shaft 419 will cause such cups 422 to open.

Upon one of the links 411 is a bracket 430 carrying a roller bearing 431. Complemental thereto is a peripheral cam 432 which cam 432 is secured to the link 405. This cam and roller govern the distance between the shafts 406 and 412 during the outward thrust of said shafts beyond the point where said shafts attain their highest elevation and while cranks 405 and 411 on their outward movement approach a horizontal position. The tendency of said shafts at this time is to approach one another.

From the shaft 412 projects a square pin 433. In association with such pin is a hook 434, which hook is mounted for sliding movement adjacent to the upright 43, said member being adapted to be operated by the cam which in the first illustrated device herein is adapted to actuate the knock-out device.

The cycle of operations of the coring device is as follows. The cups 66 pass under scoops 422 when these are slightly higher than is shown in Figure 29. As soon as the paired pear cups 66 are beneath the coring scoops 422, motion is imparted to the hook 434 by the movement of the said knock-out cam, as hereinabove mentioned. The downward movement of the hook 434 which has a flat face is such that it engages the square pin 433, thus drawing the shafts 412 and 406 closer together where they remain until drawn closer together near the end of their outward stroke.

As the cups 422 are pivoted at 423, movement of the shaft 419 brought about by the downward movement of the shaft 412 will cause said scoops 422 to partially close. Downward movement of the scoops 422 is arranged so that the edges thereof cut the cords or strings in the pear transversely as the cutting edges of the scoops 422 approach one another. Thus the scoops 422 may be made to partially surround the core material if the scoops 422 are lowered.

Concurrently, there is a movement of the link 408 upwardly whereby the bracket portion 416 is made to approach the cups 66 so that, as the two parts described operate conjointly, the scoops 422 penetrate into the meat of the halved fruit in the cups 66, and the cups 422 are made to partially close after said scoops 422 have cut through the threads of the core of the fruit in the cups 66. A partial closing of the scoops 422 only may be had by the movement of the hook 433. It is to be noted again that the pin 433 is square and that the face of the hook 434 is flat, hence, a ready disengagement therebetween occurs coincidental with arcuate movement of the shaft 412.

At the beginning of the cutting or incising operation, just described, the scoops 422 are spread to an angle that their lower and cutting edges are vertically perpendicular, and these edges subsequently approach one another forming an open bottomed V.

While there is but a partial scooping out of the core in this manner, movement in the opposite direction is imparted to the link 408 by the cam 186 which operates the cup lifting mechanism, and this movement causes outward arcuate movement of the cranks 405, and, of course, concurrent movement outward of the cranks 411, the several cranks carrying with them the shafts 406 and 412 which are maintained in substantially vertical parallelism.

The grip which the scoops 422 have upon the fruit meat is sufficient to permit of said scoops lifting the halved fruit from the cup to carry such halved fruit outwardly of the device. When the full downward movement of the link 408 is completed, the shafts 406 and 412 have attained their outermost position and are approaching a position where the cranks 405 and 411 approach the horizontal, as is shown in Figure 31. After the shafts 406 and 402 pass their highest elevation, and during outward movement thereof, the cam 433 engages the roller 431 to maintain the shafts 406 and 412 a predetermined distance apart. By shaping the cam 433 properly, the shaft 412 is allowed to slowly approach the shaft 406 as the end of the outer strokes thereof are completed, the approach of shaft 412 toward shaft 406 causing the shaft 419 to again travel downwardly through the sleeve 420 until the cutting edges of opposed scoops 422 are brought into intimate contact, thus scooping out in its entirety the core of the fruit and releasing the halved fruit freed of its core onto a belt conveyor, or into a receptacle, or otherwise disposing of it, as may be provided in the cannery. The cam 432 is shaped to prevent excessive movement of shaft 412 toward shaft 406 to prevent injury to cups 422 as well as to prevent too early closing of the scoops 422. A reverse operation sets in when the direction of the link 408 is reversed, the reversing of the direction of the operating link bringing about an opening of the scoops 422 to discharge the scooped out core therefrom.

The motion of the link 408 is sufficiently rapid that the halved pear or halved fruit is thrown clear of the device, the closing of the scoops 422 upon one another being so timed that it occurs just at the termination of the outer stroke of the lever 405.

This device, as is readily understood, provides not only an efficacious coring device, but also is a conveyor or discharge means to lift the halved body of the fruit away from its peel, which peel has been separated from the body of the fruit at the second station.

*The peel removing apparatus*

In one of the forms of the device shown in the higher numbered figures, Figures 32 to 37, inclusive, an apparatus for discharging peel left in the cups 66 by the paring device is shown. Such apparatus is generally disposed at the fourth station of the apparatus, or intermediate the vertical frame members 43 and 44. This instrumentality includes a V-shaped bracket 325, the central portion of which is disposed about the shaft 61. Arms 326 and 327 of said bracket 325 extend to corner posts 43 and 44 to be secured thereto by bolts or otherwise. The outer ends of arms 326 and 327 have flanged portions for this purpose.

Heretofore, it has been usual to operate the peeling knives by a segmental gear secured to shaft 61. In the present device, the peeling knives are differently operated. An arm 328 is disposed upon the opposite side of said shaft 61 from whence heretofore the segmental gear for operating the peeling knives has heretofore depended. Said arm 328 rocks back and forth in a horizontal plane, as it transmits the oscillating motion of shaft 61 to the peeling wipers through a plurality of links.

Attached to the arm 328 at a pivot point 329 is a link 330. At the end of member 330 and pivoted thereto is another link 331. Link 331 is pivoted upon frame leg 327. Another link 332 is pivoted to the end of link 331. Freely rotating upon the shaft 61 is an additional link 333, the outer end of which is pivotally connected to link 332. Secured to the part supporting the link 333 is a segmental gear 334.

Said supporting part comprises a collar having as an upper portion the link 333 and therebeneath and separated therefrom, an L-shaped portion in longitudinal section, the under face of the short leg of the L comprising the segmental gear 334.

Beneath the part comprising the link 333 and the segmental gear 334 is a gear housing 335 which is suitably anchored about but held against rotation with the shaft 61. Said member 335 includes an extension portion 336 having depending therefrom a bracket 337. At its front end, member 335 has two spaced apart vertical slots 338, the upper portions of which may be enlarged, extending from the top of member 337 to a point parallel with the lower portion of stub shafts 339 which are mounted in the portions 336 and 337, being feathered therein against axial displacement.

In the housing 335 and journaled in the sections 336 and 337 for free rotation, as indicated, are the two stub shafts 339. Each shaft 339 has a gear 340 thereon meshing with the segmental gear 334, the ratio of the gears being such that the shafts 339 are rotated one hundred eighty degrees upon movement of the gear 334 in either direction through the plurality of links heretofore described. Shafts 339 may be keyed either in the part 336 or part 337, as preferred, to prevent axial displacement.

Each of the shafts 339 has a slotted end 341, the purpose of which will shortly appear. Slot 338 in the member 337 is of the same width as the slot 341 in the corresponding shaft 339, and the inside faces of the slot 341 are parallel with the inside faces of the shaft 339 at the commencement of and at the end of the one hundred eighty degrees rotation which is imparted to the shafts 339 by the gears 334 and 340.

Secured to one of the angle irons comprising a transverse portion of the frame of the device is bracket 342 which may be bolted on or otherwise secured. Said member extends upwardly and has projected therefrom two supports 343, these being at an angle to one another. Each is normal to the axis of one of the shafts 339. Said supports 343 are horizontal and each has disposed thereupon for oscillation a frame 344 substantially coextensive with the member 343. Member 344 is secured against axial displacement along the support 343.

At the upper portion of the frame 344 is a journal 345 which supports a shaft 346 which is keyed therein against longitudinal displacement, said shaft 346 being normal to support 343. Said shaft 346 has firmly secured thereto a wiper member 347 which may be a flat disc extending through the body of the shaft 346 and which has a periphery corresponding with the internal periphery of the fruit cups 66.

In the end of the shaft 346 is a tongue 348 which is adapted to be seated in the slot 341 whereby shaft 346 is adapted to be rotated through an arc of one hundred eighty degrees as an incident to the rotation of the stub shaft 339.

At the inner ends of the member 344 are lugs 349 to which is secured a link 350 having at its lower end a ball and socket joint 351. Said ball and socket joint is coupled to a bell crank lever 352 pivoted at the point 353.

The lower portion of the bell crank lever 352 is secured to a link 354 which rides upon and with the cam which is employed for driving the oscillating shaft 61.

The operation of this specific part is as follows. The blades 347 are horizontal when fruit cups 66, which have just been emptied of the pear meat at the third station, are brought under said wipers 347. Such cups 66 still contain therein the peeling which has been separated at the second station from the body of the pear or other fruit.

When said paired cups 66 become centered beneath said wipers 347 on the shafts 346, rotary movement of one hundred eighty degrees is imparted to said shafts 346 and wipers 347 so that the wipers pass through the cups 66 engaging the peel therein to lift such peel from the cup. When said wipers 347 have completed their one hundred eighty degrees arcuate movement, the members 347 are sharply tilted outwardly through the action of the cam for oscillation shaft 61 upon the bell crank lever 352 and link 350, the impetus of the members being sufficient to throw the peelings engaged upon the edge of the wipers 347 clear of the machine.

Thereafter, the member 344 is tilted inwardly, the slotted end of the shafts 346 engaging the slot 338 as a guide. The shafts 346 are thus made to engage the stub shafts 339 with the slotted end 341 of the latter receiving the tongue 348 of the former. Repetition of the cycle of operations just described occurs with each quarter rotation of the fruit cup support.

The cam action may be arranged electively to return the shafts 346 to an horizontal position immediately after the wipers 347 have been lifted upwardly, or to return said shafts to such position after the shaft 61 shall have returned to its initial position at the end of the cycle of the operations normally performed by it.

The operation of the device

Any suitable prime mover may be employed. Such power is geared to or bolted to a transverse shaft 121 which operates in bearings in the machine frame, and which may be provided with suitable clutch mechanism.

Upon the transverse shaft 121 are numerous cams which actuate various instrumentalities in properly timed relation. Certain of these cams are of the yoke type, and others have roller bearings, traveling upon the periphery thereof. By an unique arrangement, certain cams have upon opposite sides peripheral faces operating two cams. A plurality of cams is avoided by causing a cam to operate both as a yoke cam and also as a peripheral cam. Thus in a single shaft, moving at a constant speed, rotary intermittent motion is accorded the paired fruit cups while the other instrumentalities are adapted to operate at the different stations of the device in timed relation and in synchronism with the rest periods of the fruit cups.

A sleeve carrying the spider 63 is rotated about a central oscillating shaft which central shaft 61 is arranged to actuate a large number of additional instrumentalities in the machine. Other operations are obtained by using shafts, and sleeves thereabout, such shafts and sleeves extending upwardly of the machine, using the angle irons at the corners thereof for the purpose of supporting the bearing blocks therefor. The driving and cam shaft 121 is best shown in Figures 1 and 2.

The first driven part to be taken up will be the spider 63. Intermittent motion is imparted to said spider 63 by virtue of a Geneva gear movement. The driving section of this gear is disposed upon a stud shaft 630 journaled in a bearing 631. Said stud shaft 630 is driven by bevel gears 632 intermediate an extremity thereof and in meshing engagement with the driving shaft 121 which latter is journaled in split bearings 633 affixed to the frame of the device.

The driving Geneva gear 635 is composed of a substantially circular portion which terminates in an extension 636 having a face thereof disposed beneath the plane of the driven Geneva cam 637.

The extension portion 636 has a roller 638 journaled on a pin 639 slidingly seated in the extremity of the portion 636 because of a slot 640 therein and a slide 641 in said slot, the roller 638 being disposed in the plane of the Geneva cam 637 for periodic coaction with spaced apart slots 642 provided therein to correspond with the spacing of each pair of article sustaining members 66.

Intermediate the slots 642 are arcuate surfaces 643 which are in the same plane and coact with the circular portion of the cam 635 to maintain the Geneva cam 637 against rotation during the interval defined by the circumferential extent of the circular segment of the cam 635.

The spider 63 will be moved a quarter of a revolution each time the roller 638 is projected within a slot 642, said spider 63 in the meantime being held against movement upon engagement of the circular portion of cam 635 with the arcuate surface 643 of the Geneva cam 637, thereby imparting intermittent predetermined movement of the spider 63, with periods of freedom from movement of appreciable length between each quarter turn advance of the spider 63.

Said driving Geneva gear 635 has a roller 638, as indicated above, which instead of being fixed, is mounted on a slide 641, which slide reciprocates in bearings in slot 640. The slots 642 in the Geneva star 637 are not cut the usual full length as in a standard Geneva gear.

This arrangement makes for a gentler rotation of the spider 63. It eliminates the highly accelerated motion general in a Geneva star at the time when roller 638, ordinarily stationarily mounted on the driving cam, engages the slots 642 therefor in the star gear.

The spider 63, comprising the arms 64 at ninety degree angles to one another, is rotatable with a tubular sleeve 136 which rests upon the top horizontal surface of collar 62 and in axial alignment with and about shaft 61.

Any desired means may be employed to retain the spider 63 and its sleeve 136 in its proper vertical position. This is accomplished in the present instance by a collar 139 detachably fixed to said shaft 61, the top of said sleeve 136 having its head against said collar 139. Sleeve 136 and spider 63 are rigidly joined together in any suitable manner. By this arrangement, movement of the spider 63 in unison with the tubular sleeve 136 is obtained.

Figures 4, 5 and 9 show one arrangement for overcoming the momentum of the spider 63. This is an optional addition to the device. The bracket 192, which is mounted on the shaft of the Geneva gear, carries a brake lever 193 and an adjusting yoke 194. Said brake lever 193 is mounted in said bracket 192, pivoted therein with the pin 195. To the brake lever 193 a brake band 196 with lining attached passes around a brake drum 198.

Just before the Geneva roller 638 finishes its work of turning the star 637, a point 199a on a cam 199 rotating with the Geneva 635 forces the yoke 194 and the roller 199 on the end thereof outwardly. This outward action sets the brake just enough to overcome the momentum of the spider 63 just anterior to the time said spider is about to attain its next resting position, thus reducing the jar of stopping and the coincidental wear upon the machine in its entirety.

The shaft 61 extends downwardly and terminates in a crank arm 645 which has a cam follower 646 fixed thereto to coact with a cam 647 fixed to the shaft 121 in proper timed relation with respect to the intermittent relative movement of the spider 63 so as to actuate the shaft 61 at the proper time, this being, as already indicated, the rest period of the spider 63 which, as described above, is rotated when the shaft 61 is stationary. Cam 647 may comprise the disc 234.

At the first station, when the first illustrated loading device is employed, several distinct devices are adapted to be actuated. Opening of the arms 207 and 208 is had by the actuation of the cam 234 (see Figure 21) rotating with shaft 121.

Inward and outward movement of said arms 207 and 208 are concurrent with movement of the carriage 253. Actuation of carriage 253 is had through cam 277 on the driving shaft 121.

The fruit spreading wings, as well as the opening and closing of the jaws 256 and 262 upon carriage 253, are had by movement of shaft 61.

When the stem clipping form of loader is employed, the cam 234 is employed to actuate the stem clipping knives 507.

At the second station, where the peeling is separated from the fruit, the cups 66 are lifted by the cam 186. At this station, the knives 103 are actuated by disc 277 riding on shaft 121.

While the cups are in elevated condition at this station, the knives 103 are actuated to swing over one hundred eighty degrees through the concave portions of cups 66 so, and during this operation, the segments 71 of said cups will be individually or conjointly depressed and/or spread simultaneously or in seriation in accordance with characteristics of the half fruit contained in the cup 66. The complementary sections 71 of the cups 66 are effective to sustain the article during the peeling operation.

The peeling means constituting the two strap knives 103 mounted in brackets 58 and 59 are conjointly oscillated during each period that the spider 63 is at rest and while the cups are uppermost. At this time one pair of the cups 66 is in registry with the floating pads 605.

The pads 605 serve to maintain the fruit or other articles contained in the cups 66 against rotary movement in the concavities thereof as the fruit is elevated to cause such fruit to contact directly with the face of said pads 605 prior to the rotation of the severing means 103 in a cutting stroke into the fruit in cups 66.

Movement is imparted to said knives 103 by the pinion fixed to the stub shafts journalled in each of the brackets 58 and 59, motion being imparted thereto by a rack 106 which is reciprocated by the said disc 277 on shaft 121.

The fruit pads are actuated at this time by a cam acting upon link 619. Member 619 has as an integral or separable part thereof the arm 618, and is reciprocally mounted in bearings 690 at the side of the machine. At its lower end, it has an arm 691 which terminates in a roller 692 adapted to be impinged by a cam 693 upon shaft 121, so that with the rotation of said shaft, the member 619 is moved up and down to actuate the knockout pads 615 in the manner hereinabove described.

Cam 165, also on shaft 121, at this time is supplying reciprocating side movement to the cup 66 through its various connecting members.

At this station the cups 66 are later made to drop by the same mechanism which caused them to be elevated.

In a device without the corer and peeling removing apparatus, the cups 66 may be dumped by a cam 186, as described under the heading, "Cup lifting and dumping". Such dumping action may be had at either the third or fourth station, as selected in advance. The cup standards 68 are locked against vertical movement during dumping by stationary means penetrating the camming slots 69 which receive the lifting means operating at the second station.

Dumping may be had at the fourth station to remove peelings when a corer is used at the third station and the peeling extractor hereinabove described is not employed.

At the third station a corer, when used, is disposed. This includes two cams for actuation. The movement in said device of the hook 434 is had by cam 693. The movement of the clam shell scoops which remove the core of the fruit is obtained by the cam 186 which raises and lowers the cups 66.

When the peeling wipers are employed, these are at the fourth station, and these likewise are operated by two different movements. Shaft 61 rotates the wipers themselves by a series of links, while the wiper shafts are lifted by cam 647, said cam 647 actuating link 354 secured to bell crank lever 352.

For changing the machine from one size of fruit to another, the cups 66 and the complemental knife members 103 must be changed, this latter change being possible by merely detaching the severing instrumentality 103 from its mounting members. Should it be necessary to change the space therebetween, another spacing sleeve of a different length may be substituted.

Shaft 61, as it is actuated by cam 647, operates the wings to spread the split fruit and the jaws of carriage 253 which hold the fruit while being split. Its operating cam 647 may be compactly formed with cams 234 and 277 to provide a single unit as shown in Figures 2, 21 and 22, cam 277 concurrently drives the fruit carriage 253 and the strap peeling knives 103. (Figure 22.)

I claim:

1. A device for treating fruit comprising a frame, cups for rotation about said frame, said frame having a plurality of fruit treating stations therein, one of said stations having means for clipping the end of the fruit, means for sectioning the fruit, means for separating the sections of fruit, and means to force the said sections into the cups, knives at a succeeding station operating on the sections of fruit in said cups to separate its epidermis, and means at another station for discharging the peeled fruit from said cups.

2. A device for treating fruit comprising cups to receive sections of fruit, means for advancing the cups from position to position, means for clipping the end of the fruit, sectioning the fruit, and separating the sections of fruit, in combination with means for forcing the sections into said cups at one position, knives operating on the sections of fruit in said cups in another position to separate the epidermis, and means at a third position for removing the core from the fruit.

3. A device for treating fruit comprising cups to receive sections of fruit, in combination with means for clipping the end of the fruit, sectioning the fruit, and separating the sections of fruit, anterior to the fruit being received in said cups, and knives operating on the sections of fruit in said cups to separate its epidermis after deposit in said cups, means for removing the fruit from said cups independent of the separated peeling, and means for separately discharging the peeling from said cups.

4. Fruit treating apparatus comprising a cup to receive halved fruit, and a scavenging member having a blade the periphery of which is complemental to the interior surface of the cup for wiping such interior.

5. Fruit treating apparatus comprising a cup to receive fruit, and a wiper member comprising a relatively stiff blade having an edge corresponding in shape to the surface of the interior of said cup and arranged longitudinally of said cup and rotatable thereabove to sweep in close proximity to the interior surface of said cup.

6. Fruit treating apparatus comprising a cup to receive fruit, and a scavenging member having a shaft traversing said cup, a blade of relatively stiff material and having an edge shaped to conform with the interior periphery of said cup, said blade being disposed on said shaft for wiping said cup, and means for rotating said shaft.

7. Fruit treating apparatus comprising a cup, a shaft parallel to the open side of said cup and arranged to traverse said cup, a wiper of relatively stiff material in the form of a plate having an edge shaped to correspond with the interior of said cup on said shaft, means for rotating said shaft to cause said wiper to travel in close proximity to the interior wall of said cup, and means for tilting said shaft away from said cup, subsequently to each wiping movement thereof.

8. A fruit peeling device comprising a cup for holding fruit, means for peeling the fruit contained in said cup, and a lifter having parts penetrating the fruit from above for removing such fruit from the cup after it has been peeled.

9. The combination with paired cups between which a pear is held, means for moving said cups in a linear path, and a splitting knife in the path of said cups, the cups being spaced apart to provide a runway for such knife, of means for separating and discharging fruit from said cup, and other cups arranged in pairs to receive the discharged split fruit, the separating and discharge means being in juxtaposition to said splitting means and engaging the pear during the splitting operation.

10. A device for treating fruit comprising a frame having a plurality of fruit treating stations thereabout, cups movable about said frame for registry with said stations, a loading mechanism at one of said stations, said loading mechanism comprising means for clipping an end from the fruit, means for sectioning such fruit, means for separating the sections of such fruit one from another, and means for loading the sections into said cups, paring means at a succeeding station operating upon the sections of fruit in said cups to separate the epidermis from the fruit, and means for discharging the peeled fruit from said cups.

11. A fruit treating device comprising cups for receiving sections of fruit, means for moving said cups, loading apparatus for said cups comprising means for clipping the end from fruit, means for sectioning such fruit, and means for separating the sections of fruit preliminary to inserting the sections into said cups, and knife members operating on the sections of fruit in said cups, one of said knife members separating the epidermis from the fruit, and another of said knife members removing the core from the fruit.

12. Fruit treating means comprising means for splitting fruit, paired receiving members in series to receive the sections of the split fruit, the individual receiving members of each pair of receiving members being substantially parallel, opening in the same plane and being conjointly movable in the same direction, paring means operable upon the sections of fruit in said receiving members, members for coring the fruit in said receiving members, said coring means removing the peeled fruit from said receiving means free from the previously detached peeling, and means for discharging the peeling from said receiving members.

13. Fruit treating apparatus comprising complemental opposed fruit holding members, means for supporting said members, means for reciprocating said members conjointly in spaced-apart parallel linear paths, and a stationary knife intermediate the linear paths of said members and removed from the extremities of such linear paths, said knife slicing into sections a fruit held between said holding members during the linear movement thereof and having a body possessing parallel sides with a cutting edge at its front, said knife being positioned substantially normal to the linear movement of said holding members and extending from end to end completely and unbrokenly across the fruit holding sections of said members.

14. Fruit treating apparatus comprising a series of pairs of receiving cups, the axes of the cups in each pair of cups being substantially parallel and the path of movement of succeeding pairs of said cups being substantially identical, in the same direction and in the same plane, and a conveyor for feeding fruit to said receiving cups and comprising opposed members having open sides normally in spaced-apart parallel planes normal to the plane of movement of said cups, means for reciprocating said opposed spaced-apart members along a linear path, a splitting member operable between said opposed members to bisect fruit held therebetween, and means contiguous to said splitting member and registering with said receiving cups for spreading the sections of fruit thus contained into said receiving cups.

15. Apparatus as described in claim 14, and in which said spreading means comprises paired flat members about which the sections of fruit move coincidentally with the splitting thereof.

16. Apparatus as described in claim 14, and in which said splitting means comprises paired flat members over which the flat faces of the sections of fruit move during the splitting operation, and in which said opposed members cooperate with the spreading members to guide the sections of fruit into said paired receiving cups.

17. Fruit treating apparatus comprising paired receiving cups having alined open tops, and feeding apparatus therefor comprising a knife to split fruit, and wings for discharging the sections split from the fruit into said receiving cups, said wings normally being in alinement with and in juxtaposition to the cutting edge of said knife and coming into contact with the flat surfaces of the fruit sections coincidentally with the fruit splitting operation, and means for moving said wings to a position in substantial parallelism with the open top of said receiving cups after the fruit splitting operation is completed.

18. Fruit treating apparatus comprising paired fruit receiving cups having open faces, a knife for splitting fruit disposed between and at one end of said cups and having a cutting edge normal to the open face of said cups, means engaging the split-apart sections of fruit during the splitting operation for selectively guiding one section of the split fruit into one receiving cup and the other section into the other receiving cup, said guiding means comprising wings normally parallel one with another and in alinement with the cutting edge of the splitting knife, said wings engaging a part of the fruit while another part of the fruit is in contact with said splitting knife and being pivoted one to another at an edge thereof, and means for moving said wings about their pivots.

19. In combination, means for dividing a fruit, a receiving means for each of the sections of fruit thus obtained, means for paring each section of such fruit in its individual receiving means, a member for removing the core from the fruit and for removing the fruit from said receiving means, and means for scavenging the receiving means after the removal of the pared fruit from said receiving means.

20. In combination, means for dividing a fruit, receiving means for each of the sections of fruit after division, means for paring each section of fruit in its individual receiving means, means for removing the core from the peeled fruit and for removing such fruit from the receiving means, and means for actuating said several means in timed sequence.

21. Apparatus for preparing fruit for canning comprising means for holding a fruit, cutting means for detaching an end of the fruit, a receptacle loading means for receiving the fruit, means for splitting fruit in said loading means, guiding means engaging each of the sections of the fruit in said loading means, movable receptacles to receive the sections of fruit from said guiding means, paring means operable on the fruit sections in said receptacles, means for coring the peeled fruit and for discharging the fruit from said receptacles, means for scavenging the receptacles after the fruit is removed therefrom, and means for moving said receptacles and actuating said several fruit treating means in timed relation.

22. Apparatus comprising a knife, a reciprocating carriage comprising cups having opposed dished faces movable toward one another to hold a fruit therebetween, said cups when in proximity being spaced apart to admit of passing said knife, the cutting edge of the latter traversing a fruit held between said faces and being normal to the axis of such fruit, said carriage being movable from one side of said knife to the other side thereof a distance greater than the length of the fruit held therein, and other cups having open faces in alinement and arranged in pairs and movable into juxtaposition to one end of the path of movement of said carriage to receive the sections of the fruit from said carriage after movement of the fruit beyond said knife.

23. Fruit treating apparatus comprising a knife, a reciprocating loading means to receive a fruit, said loading means having separable opposed cups between which the fruit is held and between which there is space for the passage of said knife, the cutting edge of said knife being normal to the axis of a fruit in said conveyor, and said loading means being movable in a path extending distances on opposite sides of said knife greater than the length of the fruit to be split thereby, other cups contiguous to said knife to receive half sections of fruit from said loading means, and wings engaging the half sections of fruit during the splitting thereof by said knife, said wings guiding such sections of fruit from said loading means into said second mentioned cups.

24. Fruit treating apparatus comprising a reciprocating member receiving a whole fruit and dividing such fruit into segments, spaced-apart cups arranged in successive pairs and movable in unison and in one direction to and from a loading position in registry with said reciprocating member, means for guiding the segments of a fruit from said reciprocating member into the succeeding pairs of said movable cups, and knife members operable upon the individual segments of fruit in said paired movable cups.

25. The combination with a pair of opposed reciprocating cups between which a fruit is held, and a stationary splitting knife removed from the ends of the path of reciprocating movement of said cups and having a cutting edge for dividing the fruit in said cups into segments, of paired receptacles having open faces in a plane normal to the plane of the cutting edge of said knife to receive the sections of a fruit from said cups, said receptacles being conjointly movable in the same direction and in substantially identical paths, means for transferring the sections of the fruit from said cups to said receptacles, peeling means for paring the sections of fruit in said receptacles, and means for actuating said cups, receptacles, transfer means, and peeling means in timed relation.

26. The combination with reciprocating spaced-apart opposed paired cups between which a fruit is held, and a splitting knife removed from the ends of the path of the movement of said cups and having a cutting edge normal to such path for dividing a fruit in said cups into segments, the cups being disposed at opposite sides of said knife during the splitting operation, of a series of paired receptacles to receive the segments of the split fruit from said cups and to support said segments with the cut faces thereof in parallelism, means for transferring the segments of the fruit from said cups to successive pairs in said series of paired receptacles, means for moving the receptacles of said series in paired relation in a single plane in unison and in the same direction, peeling means for paring the segments of fruit in said receptacles after movement away from said splitting knife, and means for actuating said cups, receptacles, transfer means, and peeling means in timed sequence.

27. The combination with paired opposed cups for holding a fruit therebetween, and means operable between said cups for dividing a fruit held in said paired cups into substantially equal segments, of means also operable between said paired cups for transferring the segments of fruit from said opposed cups, a series of paired receptacles to receive the segments from said transfer means, said receptacles being movable in pairs in a predetermined fixed spaced relation and having open tops at all times in the same plane, and means for operating said several cups and said transfer means in synchronism.

28. The combination with reciprocable paired cups between which a fruit is held, and a splitting knife operable between said cups to divide such fruit into segments and disposed at a point removed from the ends of the path of movement of said paired cups, of paired receptacles having a path of movement in proximity to said splitting knife to receive the segments of fruit at one end of the path of the reciprocating movement of said cups, means contiguous to said splitting knife and in registry with a pair of said receptacles for transferring such segments from said paired cups to said paired receptacles, knife members operable upon such segments while in said receptacles, and means for operating said cups, receptacles, transfer means, and knife members in a selected sequence.

29. Fruit treating apparatus comprising a conveyor for whole fruit, actuating means for said conveyor, and a splitting knife, the conveyor comprising paired opposed spaced-apart cups movable past said knife with one cup on each side thereof, in combination with a series of radially disposed paired receptacles movable in one direction in unison and having open faces, said open faces being uppermost at all times, means for advancing said receptacles a pair at a time to a position in which said knife is intermediate said receptacles and adjacent to one end thereof, and means for separating the paired segments of fruit in said conveyor one from another and discharging said segments into the pair of said radially disposed receptacles in registry with said knife.

30. Fruit treating apparatus comprising a reciprocating conveyor having spaced-apart paired opposed complemental like members with open faces normally in parallel adjacent planes and movable from parallelism one with another to release fruit therefrom, a splitting knife in a plane intermediate the adjacent normal planes of said members and engaging fruit in said members to divide such fruit into segments, and means for moving said conveyor from one side of said knife to the other side thereof a distance greater than the length of a fruit therein, in combination with paired cups in definite spaced relation one with another, said pairs of cups being in a series and each pair of cups having open faces in alined planes, fruit treating means operating upon halves of fruits in said paired cups, and means movable from a plane between the parallel planes of said opposed members of said conveyor to the alined planes of the open faces of a pair of said cups for separating segments of a fruit in said conveyor and inserting such segments into a pair of cups.

31. Fruit treating apparatus comprising a reciprocable conveyor for a whole fruit, and a splitting knife, the conveyor comprising opposed like members adapted to receive a fruit therebetween for movement from one side to the other side of said knife a distance greater than the length of such fruit for dividing such fruit into segments, the path of said knife being between said members and diametric of a fruit therebetween, in combination with a series of paired receiving receptacles in juxtaposition to one end of the path of movement of said conveyor members, each pair of receiving receptacles in said series having open faces in a single plane normal to the plane of said conveyor members during the splitting operation, peeling and coring mechanisms operable upon fruit in said receiving receptacles, said mechanisms being operable with the cut faces of the fruit in said receiving receptacles in parallelism, and means disposed in juxtaposition to said knife and registering one after another with said series of paired receiving receptacles for separating the segments of fruit in said conveyor and depositing them in successive pairs of said receiving receptacles.

32. The combination with a fruit treating apparatus comprising a series of paired receptacles for holding the two halves of a split fruit, and means for moving said receptacles, of a splitting knife having a cutting edge registering with successive pairs of said receptacles in a position between said receptacles and adjacent to one end thereof, a conveyor for a whole fruit having separable similar members spaced apart to provide a runway for said splitting knife, overhead support for said members, said members being adapted to be spread apart from their lower edges to receive whole fruit and to discharge split fruit therefrom, said members gripping a whole fruit about its periphery, a spreader member in juxtaposition to and in alinement with the cutting edge of said splitting knife and disposed above said series of paired receptacles for discharging the split fruit from said conveyor into a pair of said receptacles, and means for moving said conveyor from a position wholly at one side of said knife to a second position wholly beyond said knife and into registry with said spreader member.

33. In combination, a plurality of article treating means comprising paring and coring members, article sustaining means movable relative thereto, holding means for contacting articles in said sustaining means, the paring member being operable upon an article while said holding means is in contact with such article, the coring member being operable upon such article after said paring member has completed its operation thereon, said coring member moving the pared article away from the peel detached therefrom and out of said sustaining means to discharge the fruit from said sustaining means separate from the peel remaining in said article sustaining means.

34. In combination, a plurality of article treating means, article sustaining means movable relatively to said plurality of article treating means, said article treating means comprising a paring member and a coring member, holding means for contacting an article in said sustaining means, said paring means being operable upon such article while said holding means is in contact therewith, and means for separating the holding means from said article after the paring operation is complete, said coring means thereafter being operable upon such pared article in said sustaining means and moving said article out of contact with its detached peel and out of said sustaining means separate from the peel remaining therein.

35. In combination, a plurality of article treating means, article sustaining means movable relatively to said plurality of article treating means, said article treating means comprising a paring member and a coring member, holding means for contacting an article in said sustaining means, said paring means being operable upon such article while said fruit holding means is effective, said coring means moving the article from out of contact with its detached peel and out of said sustaining means to discharge the article from said sustaining means separate from the peel remaining therein, and means for subsequently scavenging the article sustaining means of such peel.

36. In combination, a plurality of article treating means, article sustaining means movable relatively to said plurality of article treating means, said article treating means comprising a paring member and a coring member, holding means movable into contact with an article in said sustaining means, said paring member being operable on such article while said holding means is in contact therewith, means for separating the holding means from such article after the paring operation is complete, said coring member having means for moving the pared article away from its detached peel and out of said sustaining means to discharge the article from said sustaining means separate from the peel remaining therein, and means for subsequently scavenging the article sustaining means of such peel.

37. In combination, successive fruit sustaining members, means for moving said fruit sustaining members, epidermis severing means conforming in contour with and adapted to follow the internal periphery of said sustaining means for removing a peel from a fruit in said sustaining means, coring means operating upon such pared fruit after it has been moved away from said epidermis severing means, and means for simultaneously but independently actuating said severing and said coring means.

38. In combination, a pad, article sustaining means arranged in series, means for moving the individual members of said series of sustaining means one at a time into and out of confronting registry with said pad, means for effecting relative movement between the registered sustaining means and said pad, fruit paring means operable upon fruit between said pad and said sustaining means, means for releasing said pad from an article in said sustaining means, coring means operable on a pared article in said sustaining means after the pad has been moved out of registry with said sustaining means, and means for actuating said coring means to detach the core from such article.

39. In combination, a pad, article sustaining means arranged in series, means for moving the individual members of said series of sustaining means one at a time into and out of confronting registry with said pad, means for effecting relative movement between the registered sustaining means and said pad, peeling means operable during the registry of said pad and sustaining means, means for releasing said pad from an article in said sustaining means, a member for coring such article comprising means for discharging the article from said sustaining means independent of its peel and operable upon such article in said sustaining means after said sustaining means has been moved out of registry with said pad, and means for actuating said coring means to detach the core from the peeled article.

40. In combination, a pad, article sustaining means arranged in series, means for moving the individual members of said series of sustaining means one at a time into and out of confronting registry with said pad, means for effecting movement between the registered sustaining means and said pad, paring means operable during the registry of the sustaining means with said pad, means for releasing the pad from an article in said sustaining means, coring means comprising means for removing the core from the article and for discharging a peeled article from said sustaining means independent of its peel and operable on a peeled article in said sustaining means after said sustaining means has been moved out of registry with said pad, means for actuating said coring means to detach the core from such peeled article, and means for discharging the peel from said sustaining means after the peeled article has been discharged from said sustaining means.

41. In combination, relatively movable members for supporting and retaining an article therebetween when said relatively movable members are in proximity, epidermis severing means of predetermined shape for removing the peel from an article supported between said relatively movable members, a coring member operable after said relatively movable members have been separated, the coring member comprising means for removing the core of and for discharging the peeled article from the member in which the peeled article remains after the separation of the peel, and means for actuating said epidermis severing means, said coring member, and said relatively movable supporting members in a selected sequence.

42. In combination, a pad, article sustaining means, means for effective relative movement between said pad and said sustaining means to confine an article therebetween, a paring knife, means for actuating said paring knife to sever the epidermis from an article in said sustaining means when said pad is effective to maintain an article therein, means for effecting the release of said pad from an article, and coring means operable upon the peeled article after its release from said pad.

43. In combination, a pad, article sustaining means confronting said pad, means for effecting relative movement between said pad and said sustaining means to confine an article therebetween, paring means operable upon an article in said sustaining means when confronted by said pad, means for actuating said paring means, means operable subsequent to the actuation of said paring means for effecting the release of the pad from the pared article, and means operable upon the pared fruit for coring such fruit and for discharging it from said sustaining means.

44. In combination, a pad, article sustaining means confronting said pad, means for effecting relative movement between said pad and said sustaining means to confine an article therebetween, paring means operable while said pad and sustaining means are in proximity, means for effecting the release of said pad from an article in said sustaining means, means for discharging the pared fruit from said sustaining means comprising a coring means operable upon the fruit after the pad is released therefrom, and means for actuating said pad, paring means, pad release means, and coring means in timed sequence.

45. A device comprising relatively movable members, one member containing a half section of a fruit and having a recess corresponding to the shape of such half section, and the other member having a flat face approximating the flat side of such half fruit, said latter named member maintaining the half fruit in the first named member, epidermis severing means having a shape corresponding to the periphery of the fruit from end to end and effective to remove the peel from an article between said relatively movable members when said members are in proximity, means for removing the core from the article and for discharging such article from said first mentioned relatively movable members when said relatively movable members are apart, means for actuating said epidermis severing means when said relatively movable members are in proximity, and other means for operating said core removing means when said relatively movable members are apart.

46. In combination, a pad, article sustaining means comprising a cup, means for effecting relative movement between said pad and said cup to contain an article therebetween, paring means, means for actuating said paring means upon an article between said pad and said cup when in proximity, a plunger supported by said pad to confront an article engaged by said pad, means operable to move such plunger out of said pad and against such article to effect the release of the article from said pad when said cup and said pad are separated, and means for coring such article and for discharging it from said cup after the plunger has disengaged the article from said pad.

47. The device described in claim 46, having in combination therewith means for scavenging the cup subsequent to the discharge of the article therefrom.

48. In combination, a cup for holding a half fruit, means for separating the peel from such half fruit while in said cup, and means operable after the fruit and peel are separated for concurrently coring such fruit and for discharging the fruit from said cup independently of its detached peel.

49. In combination, a cup holding means, means for paring a half fruit in said cup holding means, and coring means operative on such fruit while in said cup holding means with the peel previously detached therefrom, said coring means conveying the body of the fruit out of said cup holding means for discharging the body of the fruit from the latter, the movement of the body of the fruit out of said cup holding means by said coring means being independent of the peel contained in said holding means.

50. In combination, fruit holding means comprising a cup, means for imparting intermittent movement thereto, paring means, means for removing the core from the fruit and for separating the pared fruit from its detached peeling, and means operating said peeling means and said coring means on a fruit in said holding means in predetermined sequence when said holding means is stationary.

51. In combination, successive article sustaining means comprising cups of predetermined shape, epidermis severing means, means removing the core from the article and for discharging from said sustaining means the fruit pared therein and operable independent of said epidermis severing means, and means for actuating said sustaining, severing and coring means in periodic timed relation.

52. In combination, successive article sustaining means comprising cups of predetermined shape, epidermis severing means correspondingly shaped to coact with the interior of said sustaining means, coring means for coring and for discharging pared articles from said sustaining means, means for actuating said severing means and said coring means with succeeding sustaining means, and means for discharging the peel from said sustaining means.

53. In combination, successive article sustaining means of predetermined shape comprising cups having relatively movable complemental parts, severing means adapted to coact with said sustaining means, means for shifting the position of the parts of said sustaining means during movement of said severing means, means for actuating said severing means in periodic timed relation with successive sustaining means, means for maintaining an article in said sustaining means during the peeling operation and thereafter, and coring means for coring the article and for discharging the sustaining means of such pared article.

54. In combination, successive holding means comprising cups, peeling means engaging fruit in the first of said cups, coring means engaging fruit in the second of said cups for coring it and for discharging it therefrom, and means for operating said successive cup holding means, said peeling means, and said coring means in timed relation.

55. In combination, successive holding means comprising cups each for receiving a half fruit, a fruit peeling member operable upon a half fruit in one of said cups, a coring and cup discharging member operable upon such fruit after it has been peeled, and means for periodically and in timed relation moving said successive holding means to said peeling member and thereafter to said coring and cup discharging member.

56. In combination, fruit treating apparatus comprising a cup holding member for a half fruit, peeling means operative on fruit in the cup holding means to remove the peel from the body of such fruit while maintaining the body and peel in the same relative position occupied before peeling, and coring means operative on such peeled fruit to separate it from its peel and to concurrently core it.

57. In combination, an intermittently movable conveyor having cup means for receiving a half fruit, a peeling means operable on the half fruit in said cup receiving means, and coring means operable on such half fruit subsequent to the action of said peeling means therein and effective while such half fruit is contained in said cup receiving means, said coring means having a part for concurrently discharging the half fruit from said cup receiving means and for moving it away from contact with its peel.

58. In combination, successive article sustaining means comprising cups of predetermined shape, epidermis severing means operable within one of said cup sustaining means and having a shape complemental to the shape of said cup sustaining means, means for coring the article and operable independently of said severing means, fruit elevating means to lift the fruit from said cup sustaining means to separate it from the peel contained in said sustaining means, and means for actuating said sustaining, severing, coring and elevating means in periodic timed relation.

59. In combination, successive article sustaining means of predetermined shape, epidermis severing means cooperating therewith and having a shape corresponding to the interior of said sustaining means, means for urging an article into contact with said sustaining means during and after the paring operation, discharge means for separating the peeled fruit from its peel, fruit coring means on said discharge means, and means for actuating said sustaining, severing, urging, discharge and coring means in periodic timed relation.

60. In combination, successive article sustaining means of predetermined shape, epidermis severing means cooperating therewith and having a shape complemental thereto, means for urging an article into contact with said sustaining means during the paring operation and thereafter, fruit discharge means for separating the peeled fruit from its peel, coring means operative with said discharge means, peel discharge means for ridding the sustaining means of the peel, and means for actuating said sustaining, severing, urging, coring and said fruit and peel discharge means in periodic timed relation.

61. In combination, a cup receptacle for the reception of a half fruit, means for paring such half fruit in said receptacle without discharging the half fruit and detached peel therefrom, and means for thereafter separately discharging such peeled half fruit and such detached peel from said cup receptacle independently of one another.

62. In combination, a fruit holding cup having an open side, means for scavenging said cup comprising a blade having a peripheral edge conforming with and sweeping about the interior of said cup, said scavenging means being rotatable on an axis extending diametrically of the open side of said cup, and means for rotating said scavenging means.

63. In a fruit treating device having a fruit cup, a scavenging member comprising a blade rotatable about an axis extending diametrically of said cup and having an edge complemental to the interior periphery thereof, a spindle for supporting said blade and having an axis coincident with the axis of rotation of said wing, means for registering said spindle with said cup, and means engaging said spindle coincidental with such registry for rotating said spindle and blade.

64. A scavenging device for a fruit cup and comprising a rotatable blade having a wiping edge complemental to the internal periphery of said cup, means for advancing said blade into wiping engagement with said cup, and means for rotating said blade after being so advanced.

65. Scavenging mechanism for a fruit cup, comprising a movable blade having a wiping edge complemental to the internal periphery of said cup, blade mounting means for advancing said blade into wiping engagement with said cup, and actuating means operable after the advance of said blade for moving said blade with the edge thereof in proximity with the interior of the cup.

66. In a fruit treating device having a cup in which peel remains after the discharge therefrom of the pared body of the fruit, a scavenging device comprising a blade having an edge complemental to the internal periphery of said cup, means for mounting said blade to advance said blade into wiping engagement with said cup and in which said blade is rotatable, and means intermittently engaging said mounting means for rotating said blade.

67. In a fruit treating device having a cup in which peel remains after the discharge therefrom of the pared body of the fruit, a scavenging device comprising a blade having an edge complemental to the internal periphery of said cup, a movable support member in which said blade is rotatable, means for actuating said support member to advance said blade into wiping engagement with said cup, and means intermittently engaging said support member for rotating said blade through a predetermined arc.

68. In a fruit treating device having a cup in which peel remains after the discharge therefrom of the pared body of the fruit, a scavenging device comprising a blade having an edge complemental to the internal periphery of said cup, a support member in which said blade is rotatable, means at one end of said support member for moving said support member angularly to advance said blade into wiping engagement with said cup, and means at the other end of said support member for intermittently rotating said blade.

69. In a fruit treating device having a cup with an internal surface supporting the periphery of a fruit and in which cup a fruit is received and is separated from its peel, successive discharge means for said cup, one of said means coring the fruit and removing the peeled body of such fruit from the cup, and the other means wiping the interior of the cup of the separated peel.

MARK EWALD.